US011842251B2

(12) United States Patent
Hofman

(10) Patent No.: US 11,842,251 B2
(45) Date of Patent: Dec. 12, 2023

(54) AUTOMATED COMPREHENSION AND INTEREST-BASED OPTIMIZATION OF CONTENT

(71) Applicant: Microsoft Technology Licensing, LLC, Redmond, WA (US)

(72) Inventor: Jacob M. Hofman, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 902 days.

(21) Appl. No.: 15/620,400

(22) Filed: Jun. 12, 2017

(65) Prior Publication Data

US 2018/0357562 A1 Dec. 13, 2018

(51) Int. Cl.
*G06N 20/00* (2019.01)
*G06N 5/022* (2023.01)
*G06F 16/44* (2019.01)

(52) U.S. Cl.
CPC ............ *G06N 20/00* (2019.01); *G06F 16/44* (2019.01); *G06N 5/022* (2013.01)

(58) Field of Classification Search
CPC ......... G06N 20/00; G06N 5/022; G06F 16/44
See application file for complete search history.

(56) References Cited

U.S. PATENT DOCUMENTS

| 5,924,108 | A  | 7/1999  | Fein et al.     |
| 7,620,552 | B2 | 11/2009 | Rui et al.      |
| 7,627,590 | B2 | 12/2009 | Boguraev et al. |
| 8,818,803 | B2 | 8/2014  | Weber           |

(Continued)

FOREIGN PATENT DOCUMENTS

WO  2013066497 A1  5/2013

OTHER PUBLICATIONS

Jones, et al., "Interactive Document Summarisation Using Automatically Extracted Keyphrases", In Proceedings of the 35th Annual Hawaii International Conference on System Sciences, Jan. 10, 2002, 10 pages.

(Continued)

*Primary Examiner* — Michael J Huntley
*Assistant Examiner* — Sehwan Kim

(57) ABSTRACT

A "Content Optimizer" applies a machine-learned relevancy model to predict levels of interest for segments of arbitrary content. Arbitrary content includes, but is not limited to, any combination of documents including text, charts, images, speech, etc. Various automated reports and suggestions for "reformatting" segments to modify the predicted levels of interest may then be presented. Similarly, the Content Optimizer applies a machine-learned comprehension model to predict what a human audience is likely to understand (e.g., a "comprehension prediction") from the arbitrary content. Various automated reports and suggestions for "reformatting" segments to modify the comprehension prediction may then be presented. In either case, user-selectable suggested "formatting" changes, if applied to corresponding content segments, are designed to modify either or both the predicted level of interest of one or more of the segments by either increasing or decreasing those predicted levels of interest, and the comprehension prediction relating to the arbitrary content.

20 Claims, 8 Drawing Sheets

(56) References Cited

U.S. PATENT DOCUMENTS

| | | | |
|---|---|---|---|
| 8,898,595 B2 | 11/2014 | Cragun et al. | |
| 8,965,983 B2 | 2/2015 | Costenaro et al. | |
| 2007/0124672 A1* | 5/2007 | Cragun | G06F 16/34 |
| | | | 715/234 |
| 2012/0197630 A1 | 8/2012 | Lyons et al. | |
| 2014/0003737 A1* | 1/2014 | Fedorovskaya | G06Q 50/01 |
| | | | 382/276 |
| 2015/0134574 A1* | 5/2015 | Yasin | G06F 16/93 |
| | | | 706/11 |
| 2015/0213361 A1* | 7/2015 | Gamon | G06N 20/00 |
| | | | 706/12 |
| 2015/0269153 A1* | 9/2015 | Fink | G06F 40/30 |
| | | | 707/750 |
| 2016/0085758 A1* | 3/2016 | Mahmud | G06F 16/335 |
| | | | 707/733 |
| 2018/0165590 A1* | 6/2018 | Vlassis | G06N 5/045 |

OTHER PUBLICATIONS

"Online summarize tool (free summarizing)", https://www.tools4noobs.com/summarize/, Published on: 2007, 1 pages.

Taskiran, et al., "Automatic and User-Centric Approaches to Video Summary Evaluation", In Proceedings of SPIE—The International Society for Optical Engineering, Jan. 2007, 12 pages.

Patil, et al., "Automatic Text Summarizer", In Proceedings of International Conference on Advances in Computing, Communications and Informatics, Sep. 24, 2014, pp. 1530-1534.

Neto, et al., "Automatic Text Summarization using a Machine Learning Approach", In Proceedings of the 16th Brazilian Symposium on Artificial Intelligence: Advances in Artificial Intelligence, Nov. 11, 2002, 10 pages.

Self, et al., "Auto-Highlighter: Identifying Salient Sentences in Text", In Proceedings of IEEE International Conference on Intelligence and Security Informatics, Jun. 4, 2013, 3 pages.

"Automatically Summarize a Document", https://support.office.com/en-us/article/Automatically-summarize-a-document-B43F20AE-EC4B-41CC-B40A-753EED6D7424, Retrieved on: Feb. 14, 2017, 3 pages.

Vlainic, et al., "A Comparative Study of Automatic Text Summarization System Performance", In Proceedings of the 7th European Computing Conference, Jun. 25, 2013, pp. 222-227.

* cited by examiner

AUTOMATED COMPREHENSION AND INTEREST-BASED OPTIMIZATION OF CONTENT

BACKGROUND

Existing techniques for automated read and reply type applications generally operate by automatically generating one or more suggested automated replies to an incoming email or message. In other words, typical automated read and reply techniques generally scan the incoming email or message and then generate a response that attempts to emulate a human reply to the incoming email or message. Such techniques are often based on statistical or probabilistic modeling of the incoming email or message in combination with the use of statistical or probabilistic models for generating the corresponding reply.

In addition, many techniques exist for applying various grammatical and stylistic models to text documents for generating suggested corrections to those text documents. Common examples include word-processor spelling and grammar checkers and similar applications. Such applications often either make automatic corrections while the user is typing and/or highlight or underline questionable text in combination with presenting context-sensitive suggestions for modifying that questionable text to fit a spelling, style, and/or grammar model.

With respect to user visual attention, a variety of existing modeling techniques are adapted to perform a pixel-based image analysis, without understanding the underlying content, to predict what humans are likely to pay attention to when they see content such as a webpage or image. For example, with respect to a text web page, with or without images, human viewers often scan that web page beginning with upper left corner. Typically, these types of visual attention models make predictions based on a pixel configuration of a display or screen on which the content is being rendered rather than on some human type understanding of that content.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, a "Content Optimizer," as described herein, provides various techniques for applying one or more machine-learned relevancy models to user content. In various implementations, the relevancy models are trained using any of a variety of existing machine-learning techniques to predict a level of interest of a human audience with respect to each of a plurality of segments of a particular instance of user content. In various implementations, the Content Optimizer generates a relevancy report that provides the predicted level of interest for each of the content segments. This relevancy report is then optionally presented via user interface or the like.

In general, user content includes, but is not limited to, text documents, graphical documents such as charts, diagrams, graphs, etc., images, speech, videos, etc., and combinations of any or all of these forms of content. The term "document" and related words are used interchangeably herein with the phrase "user content" and similar terms.

In general, each "segment" represents a discrete section of a particular instance of user content. In other words, segments represent any one or more features that can be identified or otherwise extracted from user content. In addition, such segments may be any combination of one or more individual features, one or more sequential features, one or more overlapping features, one or more similar features, etc., and may include any portion of that content up to and including the entirety of the content. In various implementations, segments are automatically identified by a parser module of the Content Optimizer that scans or otherwise processes the user content to divide or otherwise parse that content into logical pieces that represent the aforementioned segments or combinations of segments. Alternately, or in addition, one or more segments within a particular instance of user content can be manually delimited or selected by the user via a user interface.

In general, "formatting" associated with one or more segments of user content is defined as any one or more characteristics (e.g., visual appearance, position, sound, speech effects, etc.) that describe how those segments are presented within the user content. Consequently, the characteristics or type of such formatting, and any suggested changes to formatting, is dependent upon the particular type or combination of types of user content being processed by the Content Optimizer.

In addition to predicting the level of interest of particular segments of the user content, in further implementations, the Content Optimizer applies a formatting model, in combination with the relevancy model, to automatically generate one or more suggested changes to the formatting of one or more of those segments. Each of these user-selectable suggested formatting changes, if applied to one or more corresponding segments of the user content, are designed to modify the predicted level of interest of one or more of the segments by either increasing or decreasing those predicted levels of interest. In general, an increase in the predicted level of interest implies that it is more likely, in a probabilistic sense, that the human audience will be interested in the corresponding segment. Conversely, a decrease in the predicted level of interest implies that it is less likely, in a probabilistic sense, that the human audience will be interested in the corresponding segment.

For example, if the user wants to emphasize a particular segment of the content with respect to a particular human audience comprising one or more persons, the user can select one of the plurality of suggested formatting changes associated with an increase in the predicted level of interest of that segment. Conversely, if the user wants to deemphasize a particular segment of the content with respect to a particular human audience, the user can select one of the plurality of suggested formatting changes associated with a decrease in the predicted level of interest of that segment. In either case, any user-selected suggested formatting change is applied to the user content to reformat the corresponding segment (or multiple segments, depending upon the particular formatting change) within the user content. The reformatted user content is then optionally presented to the user for review or other use. Further, the reformatted user content is then optionally processed again by the Content Optimizer to predict levels of interest for segments of the reformatted user content. New suggested formatting changes can then be presented to allow iterative updating of the user content for as many iterations as desired.

In further implementations, one or more machine-learned comprehension models of the Content Optimizer are applied to the user content to predict what a human audience is likely to understand or to take away in response to reading, viewing, listening to, or otherwise consuming a particular instance of user content. In various implementations, this comprehension prediction is then provided as a report or the like to the user. In various implementations, this comprehension prediction includes, but is not limited to, any combination of identification of one or more particular segments of the user content, a generalized topic of the user content, a summarization of the user content, etc. As such, in contrast to the aforementioned relevancy models, which predict a level of interest with respect to particular segments of user content, the machine-learned comprehension models predict what the audience is likely to take away from the user content as a whole (or from some particular section of that content such as, for example, a single slide or page of a presentation). In various implementations, the Content Optimizer then provides one or more user-selectable suggested formatting changes to modify one or more segments of the user content in a way that changes the comprehension prediction.

As an example of the overall system, in various implementations, the Content Optimizer is implemented as a system that applies executable program modules to direct a computing device to receive user content. This system then identifies one or more segments of the user content. In response to identification of these segments, the Content Optimizer applies apply a machine-learned relevancy model to predict a level of interest for each of the identified segments. As mentioned, each of these levels of interest provides a predicted level of interest of a human audience in the corresponding segment. Next, in various implementations, the Content Optimizer optionally applies a formatting model to generate a plurality of suggested formatting changes to one or more of the identified segments. Each of these suggested formatting changes, if selected, modifies one or more of the identified segments and causes a corresponding change to the predicted level of interest as determined by the relevancy model. As such, in various implementations, one or more of the suggested formatting changes are presented for user selection via a user interface or the like, thereby enabling the user to interactively modify the predicted level of interest of a plurality of segments of the user content.

As an alternate example of the overall system, in various implementations, the Content Optimizer presents the user with a report as to the predicted level of interest of each segment of the user content. For example, in such implementations, the Content Optimizer is implemented as a system that identifies one or more segments of the user content. In response to identification of these segments, the Content Optimizer applies apply a machine-learned relevancy model to predict a level of interest for each of the identified segments. As mentioned, each of these levels of interest provides a predicted level of interest of a human audience in the corresponding segment. Next, in various implementations, the Content Optimizer generates a report that provides the predicted level of interest for each of the content segments. In various implementations, this report is then presented to the user via a user interface or the like, thereby providing the user with an understanding of what segments of the user content is likely to be of interest to a human audience comprising one or more persons.

As another alternate example of the overall system, in various implementations, the Content Optimizer is implemented as a system that applies executable program modules to direct a computing device to receive user content. This system then identifies one or more segments of the user content. In response to identification of these segments, the Content Optimizer applies apply a machine-learned comprehension model to predict what a human audience is likely to understand or to take away from arbitrary user content (e.g., a "comprehension prediction"). Next, in various implementations, the Content Optimizer optionally applies a formatting model to generate a plurality of suggested formatting changes to one or more of the identified segments. Each of these suggested formatting changes, if selected, modifies the comprehension prediction for the arbitrary user content as determined by the comprehension model. As such, in various implementations, one or more of the suggested formatting changes are presented for user selection via a user interface or the like, thereby enabling the user to interactively modify the prediction of what the human audience is likely to understand or to take away from the arbitrary user content.

The Content Optimizer described herein provides various techniques for predicting levels of interest of segments of user content in combination with various automated reports and suggestions for reformatting one or more segments to modify the predicted levels of interest for one or more of the segments. Similarly, in various implementations, the Content Optimizer provides various techniques for predicting what a human audience is likely to understand or to take away from arbitrary user content (e.g., a "comprehension prediction") in combination with various automated reports and suggestions for reformatting one or more segments to modify the comprehension prediction. In addition to the benefits described above, other advantages of the Content Optimizer will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
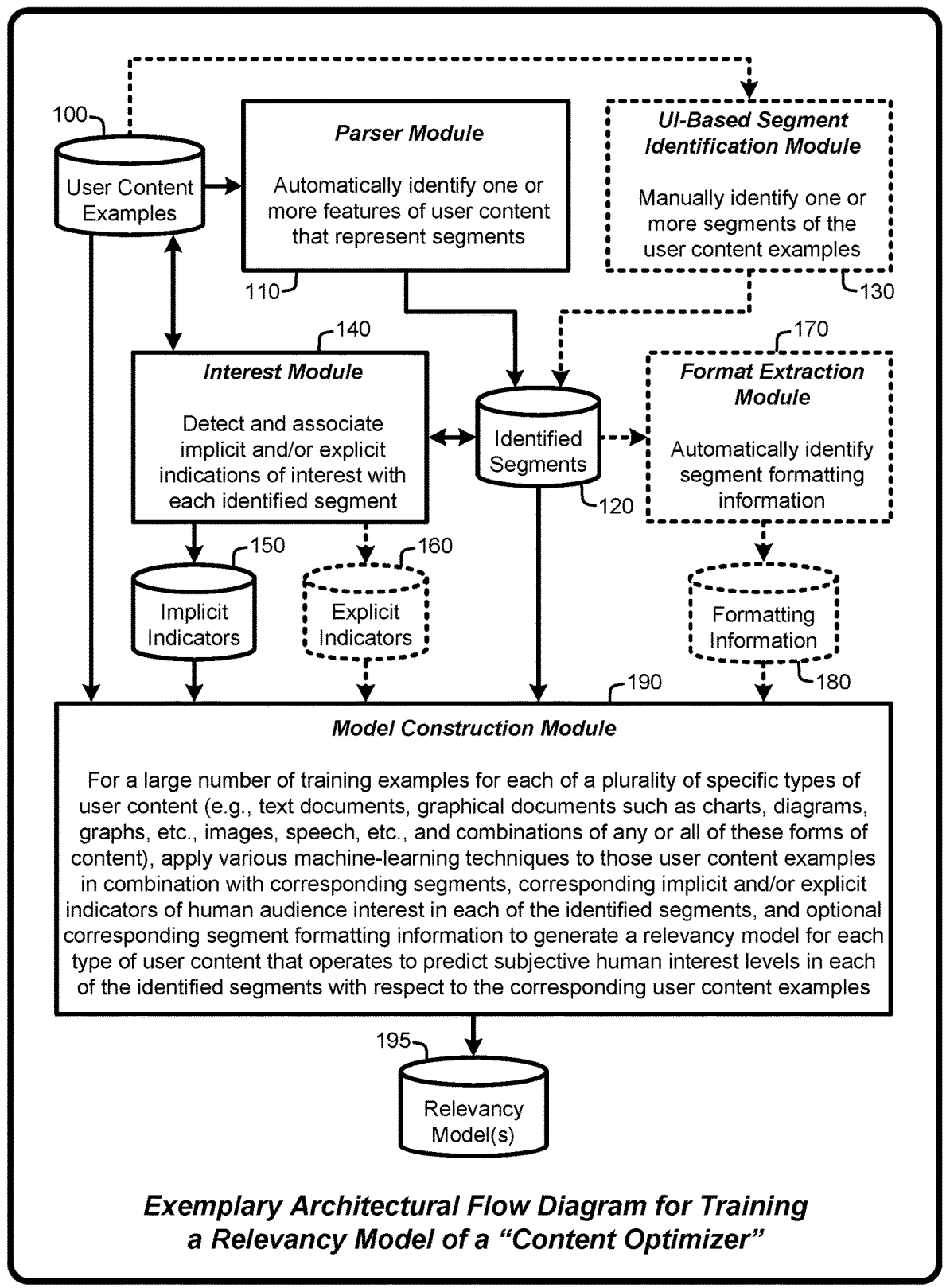
FIG. 1 provides an exemplary architectural flow diagram that illustrates program modules for training a relevancy model of a "Content Optimizer," as described herein.

In the following description of various implementations of a "Content Optimizer", reference is made to the accompanying drawings, which form a part hereof, and in which is shown by way of illustration specific implementations in which the Content Optimizer may be practiced. Other implementations may be utilized and structural changes may be made without departing from the scope thereof.

Specific terminology will be resorted to in describing the various implementations described herein, and it is not intended for these implementations to be limited to the specific terms so chosen. Furthermore, it is to be understood that each specific term includes all its technical equivalents that operate in a broadly similar manner to achieve a similar purpose.

Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Content Optimizer. Further, the appearance of such phrases throughout the specification are not necessarily all referring to the same implementation, and separate or alternative implementations are not mutually exclusive of other implementations. The order described or illustrated herein for any process flows representing one or more implementations of the Content Optimizer does not inherently indicate any requirement for the processes to be implemented in the order described or illustrated, and any such order described or illustrated herein for any process flows do not imply any limitations of the Content Optimizer.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction

In general, a "Content Optimizer" provides various techniques for predicting levels of interest of segments of user content in combination with various automated reports and suggestions for reformatting one or more segments to modify the predicted levels of interest for one or more of the segments. Similarly, in various implementations, the Content Optimizer provides various techniques for predicting what a human audience is likely to understand, to take away, to comprehend, etc., from arbitrary user content in combination with various automated reports and suggestions for reformatting one or more segments to modify the prediction of what a human audience is likely to understand or to take away from arbitrary user content.

More specifically, in various implementations, the Content Optimizer applies a machine-learned relevancy model to predict levels of interest for segments of arbitrary user content. Such content includes, but is not limited to, text documents, graphical documents, images, speech, videos, etc., and combinations of such content. The relevancy model is trained from large collections of specific types of user content in combination with either or both implicit and explicit interest indicators with respect to individual segments identified or otherwise extracted from that content.

Similarly, in various implementations, the Content Optimizer applies a machine-learned comprehension model to predict what a human audience is likely to understand or to take away from arbitrary user content. The comprehension model is trained from large collections of specific types of user content in combination with one or more content comprehension indicators that are received from a plurality of human reviewers in response to those human reviewers reading, viewing, listening to, or otherwise consuming individual instances of user content used as a training example. In general, these content comprehension indicators include, but are not limited to, an identification or specific information relating to any combination of one or more particular segments of the user content or the content as a whole, a general or specific topic associated with any combination of one or more particular segments of the user content or the content as a whole, a summarization of the user content, etc.

Following training of the relevancy model, predicted levels of interest for individual content segments of arbitrary user content is then either provided as an informational report or used as the basis to automatically generate one or more suggested formatting changes for the segments. These user-selectable suggested formatting changes, if applied to corresponding content segments, are designed to modify the predicted level of interest of one or more of the segments by either increasing or decreasing those predicted levels of interest.

As defined herein, user content includes, but is not limited to, text documents, graphical documents such as charts, diagrams, graphs, etc., images, speech, videos, etc., and further includes combinations of any or all of these forms of content.

As defined herein, each segment represents a discrete section of a particular instance of user content. More specifically, segments represent any one or more features that can be identified or otherwise extracted from user content. In addition, such segments may be any combination of one or more individual features, one or more sequential features, one or more overlapping features, one or more similar features, etc., and may include any portion of the user content up to and including the entirety of the user content. In various implementations, segments are automatically identified by a parser module of the Content Optimizer that scans or otherwise processes the user content to divide or otherwise parse that content into logical pieces that represent the aforementioned segments or combinations of segments. Alternately, or in addition, one or more segments within a particular instance of user content can be manually delimited or selected by the user via a user interface.

As defined herein, "formatting" associated with one or more segments of user content is defined as any one or more characteristics (e.g., visual appearance, position, sound, speech effects, etc.) that describe how those segments are presented by the user content. As mentioned, user content includes, but is not limited to, text documents, graphical documents, images, speech, videos, audio content, etc. Consequently, both the formatting and the suggested formatting changes, as discussed throughout this document, are expressly dependent upon the particular type, or combination of types, of user content being processed by the Content Optimizer.

For example, in the case of a text document, formatting is defined as including, but not limited to, any known text effect, or combination of such effects, such as color, font, size, bolding, italicization, highlighting, underlining, subscripting, superscripting, titles, headers, footers, footnotes, etc., and further includes, but is not limited to, organization or arrangement of positions of one or more segments within such text documents.

Similarly, in the case of human or computer-generated speech, that speech may include any combination of audio of the speaker, audience, background noise, etc., video of the speaker, audience, venue, etc., text such as subtitles, transcripts, etc. For example, consider a recording of speech (e.g., human-based speech, digital avatar-based speech, etc.), such as a person verbally presenting some topic to an audience. Consequently, formatting associated with individual segments of that speech (e.g., one or more words, sequences of words, sentences, speaker pauses or silences, speaker facial expressions, speaker body motions, audience reactions, etc.) includes, but is not limited to, order of one or more words or sequences of two or more words, order of individual sentences or sequences of two or more sentences, voice tone or volume, positions of dramatic pauses, speech emotional context, etc. Further, when video of the speech is available, formatting includes, but is not limited to, speaker facial expressions, speaker body motions, speaker gestures, the use of physical props by the speaker, audience reactions, venue characteristics (e.g., lighting, decorations, audio amplification characteristics, etc.), etc.

A variety of additional examples of formatting in the context of different types of user content are provided in Section 2.6 of this document. These additional examples are provided only for purposes of discussion and explanation are not intended to limit the types of formatting that is applicable for use with various types of user content processed by the Content Optimizer.

1.1 System Overview:

As mentioned above, the Content Optimizer provides various techniques for predicting levels of interest of segments of user content in combination with various automated reports and suggestions for reformatting one or more segments to modify the predicted levels of interest for one or more of the segments. Similarly, in various implementations, the Content Optimizer provides various techniques for predicting what a human audience is likely to understand or to take away from arbitrary user content (e.g., a "comprehension prediction") in combination with various automated reports and suggestions for reformatting one or more segments to modify the comprehension prediction. The processes summarized above are illustrated by the general system diagrams of FIG. 1 through FIG. 4.

In particular, the system diagram of FIG. 1 illustrates the interrelationships between program modules for instantiating various implementations for training a relevancy model of the Content Optimizer, as described herein. Furthermore, while the system diagram of FIG. 1 illustrates high-level views of various implementations of the Content Optimizer, FIG. 1 is not intended to provide exhaustive or complete illustrations of every possible implementation of the Content Optimizer as described throughout this document.

In addition, any boxes and interconnections between boxes that may be represented by broken or dashed lines in FIG. 1 represent alternate or optional implementations of the Content Optimizer described herein. As such, any or all of these alternate or optional implementations, as described below, may be used in combination with other alternate or optional implementations that are described throughout this document.

As illustrated by FIG. 1, in various implementations, the processes enabled by the Content Optimizer for training the aforementioned relevancy model begin operation by receiving a large volume of training data comprising multiple user content examples 100. As mentioned, user content includes, but is not limited to, text documents, graphical documents such as charts, diagrams, graphs, etc., images, speech, videos, etc., and further includes combinations of any or all of these forms of content. As such, the type of training data comprising the user content examples 100 is generally matched to one or more particular types of user content intended to be processed by the overall Content Optimizer. Consequently, each of the resulting relevancy models generated by the training process is inherently tailored or matched to the particular type of user content intended to be processed by the Content Optimizer.

In various implementations, the user content examples 100 are provided to a Parser Module 110. The Parser Module 110 is separately applied to each of the individual user content examples 100 to automatically extract a plurality of features from each of those user content examples. In other words, the Parser Module 110 applies various feature extraction techniques to automatically identify one or more features of the user content that represent segments of that content, thereby generating a separate set of identified segments 120 for each individual user content example 100.

As discussed in further detail herein, the particular types of segments extracted from the user content examples 100 are dependent on the particular type of user content being examined (e.g., text, charts, speech represented by either audio or combined audio and video, etc.). Various parsing and extraction techniques for identifying discrete features or segments of different types of content are known to those skilled in the art and will not be described in detail herein. In addition, in various implementations, an optional UI-Based Segment Identification Module 130 is provided to enable one or more human reviewers to manually identify or select one or more segments 120 from one or more of the user content examples 100.

In addition, in various implementations, an Interest Module 140 is applied to both the user content examples 100 and the corresponding identified segments 120 to detect and associate implicit interest indicators 150 and/or explicit interest indicators 160 with each identified segment 120. In general, the interest indicators (150 and 160), whether implicit or explicit provide a measure or level of interest associated with each of the corresponding identified segments 120. For example, an implicit indicator 150 may be derived from tracking eye movement or a mouse (or other pointer) while one or more human reviewers read, view, listen or otherwise interact with a particular identified segment 120 of a particular user content example 100. Similarly, for example, an explicit indicator 160 may be an interest rating or the like provided by one or more human reviewers with respect to an interest level of a particular identified segment 120 of a particular user content example 100. Further discussion of implicit and explicit interest indicators is provided in Section 2.3 of this document.

Further, in various implementations, a Format Extraction Module 170 automatically identifies formatting information 180 associated with each identified segment 120. For example, such formatting information, which is dependent on the type of user content being examined, includes, but is not limited to, bolded text in a text document, location of text or images in a document, tone of voice detected in human speech, body motions and/or gestures detected in a video of a human speech, formatting of lines, data points and/or labels in a data graph, etc. Various techniques for identifying formatting information in different types of content are known to those skilled in the art and will not be described in detail herein.

The identified segments 120, in combination with the original user content examples 100, the implicit indicators 150 of interest and optional explicit indicators 160 of interest and optional formatting information 180, are then provided to a Model Construction Module 190. The Model Construction Module 190 then generates a relevancy model 195 by applying various machine-learning techniques to the combination of inputs including, but not limited to, the identified segments 120, corresponding user content examples 100, implicit indicators 150, optional explicit indicators 160, and optional formatting information 180.

Given the relevancy model 195, the Content Optimizer is then capable of predicting levels of interest of segments identified or otherwise extracted from arbitrary user content. These predicted levels of interest are then applied for various purposes, including, but not limited to, generating relevancy reports for arbitrary user content and/or generating one or more suggested changes to the formatting of one or more segments of the arbitrary user content.

Figure 2:
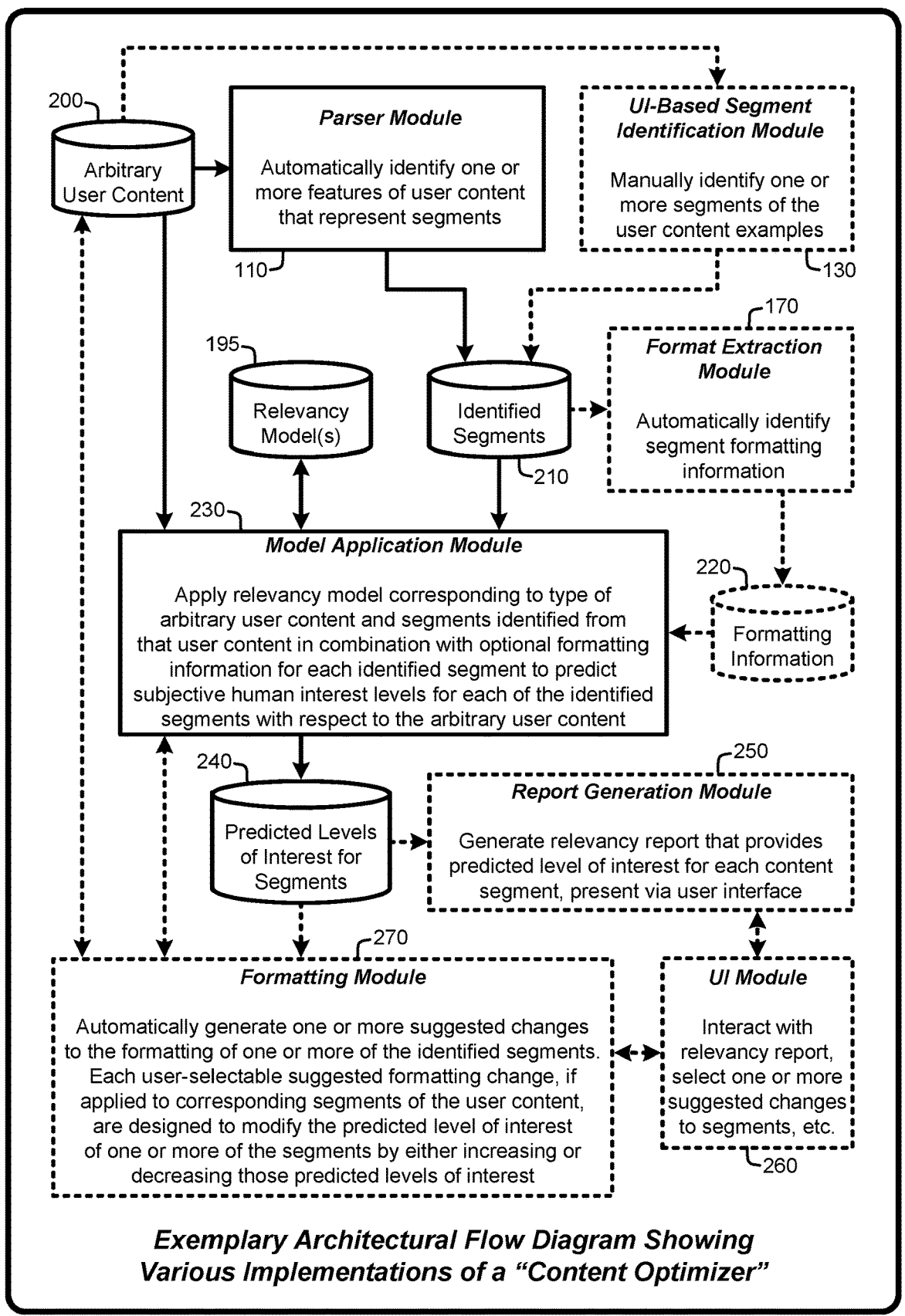
FIG. 2 illustrates use of the Content Optimizer for predicting levels of interest of segments of user content and providing various automated reports and suggestions for reformatting one or more segments to modify the predicted levels of interest for one or more of the segments, as described herein.

For example, the system diagram of FIG. 2 illustrates the interrelationships between program modules for instantiating various implementations of the Content Optimizer for applying the trained relevancy model to arbitrary user content, as described herein. Furthermore, while the system diagram of FIG. 2 illustrates a high-level view of various implementations of the Content Optimizer, FIG. 2 is not intended to provide an exhaustive or complete illustration of every possible implementation of the Content Optimizer as described throughout this document.

In addition, any boxes and interconnections between boxes that may be represented by broken or dashed lines in FIG. 2 represent alternate implementations of the Content Optimizer described herein, and any or all of these alternate implementations, as described below, may be used in combination with other alternate implementations that are described throughout this document. Furthermore, any of the components of FIG. 2 that show the same element numbers as FIG. 1 are intended to show reuse of the corresponding elements of FIG. 1 within the system diagram of FIG. 2.

More specifically, as illustrated by FIG. 2, in response to receipt of an instance of arbitrary user content 200, the parser module 110 of the Content Optimizer applies various feature extraction techniques to automatically identify one or more features of the arbitrary user content 200 that represent segments of that content, thereby generating a separate set of identified segments 210 for that arbitrary user content. In addition, in various implementations, the optional UI-Based Segment Identification Module 130 is provided to enable one or more human reviewers or end-users to manually identify or select one or more segments 210 from the arbitrary user content 200. Further, in various implementations, the Format Extraction Module 170 automatically identifies formatting information 220 associated with each identified segment 210 of the arbitrary user content 200.

Next, the arbitrary user content 200, the corresponding identified segments 210, and the corresponding optional formatting information 220 are provided to a Model Application Module 230. In general, the Model Application Module 230 applies one or more of the relevancy models 195 corresponding to type or types (e.g., multimedia document) of arbitrary user content 210 and segments 210 identified from that user content in combination with optional formatting information 220 for each identified segment. In response to these inputs, the Model Application Module 230, in cooperation with the relevancy model(s) 195 generate predicted levels of interest 240 for each of the identified segments 210. In other words, the Model Application Module 230 predicts subjective human interest levels for each of the identified segments 210 with respect to the arbitrary user content 200.

In various implementations, given the predicted levels of interest 240 for each of the identified segments 210, the Content Optimizer applies a Report Generation Module 250 to generate a relevancy report that provides the predicted levels of interest 240 for each segment of the arbitrary user content 200. In various implementations, this relevancy report is presented via a user interface or the like. In various implementations, a UI Module 260 is provided to enable users to interact with this relevancy report. Further discussion regarding user interaction with the relevancy report is provided in Section 2.7 of this document.

In addition, in various implementations, a Formatting Module 270 automatically generates one or more suggested changes to the formatting of one or more of the identified segments 210. Each user-selectable suggested formatting change, if applied to corresponding segments 210 of the user content 200 are designed to modify the predicted level of interest of one or more of the segments by either increasing or decreasing those predicted levels of interest as determined by the Model Application Module 230 through use of the relevancy model(s) 195.

For example, in various implementations, a plurality of suggested formatting changes are presented by the Formatting Module 270 via the UI module 260. In various implementations, each suggested formatting change is associated with a particular identified segment 210 (or multiple identified segments) and indicates the associated change in predicted level of interest (e.g., "increase," "decrease," or specific predicted change in the level of interest of one or more particular segments) upon user selection of the formatting change via the UI module 260. In various implementations, upon user selection of any such suggested formatting change, the Content Optimizer applies that suggested change to the corresponding identified segment (or multiple segments, depending on the suggested formatting change) to automatically modify the corresponding arbitrary user content. Other methods and further discussion of user interaction with the identified segments 210 and the arbitrary user content 200 with respect to suggested formatting changes are described in Section 2.7 of this document.

Figure 3:
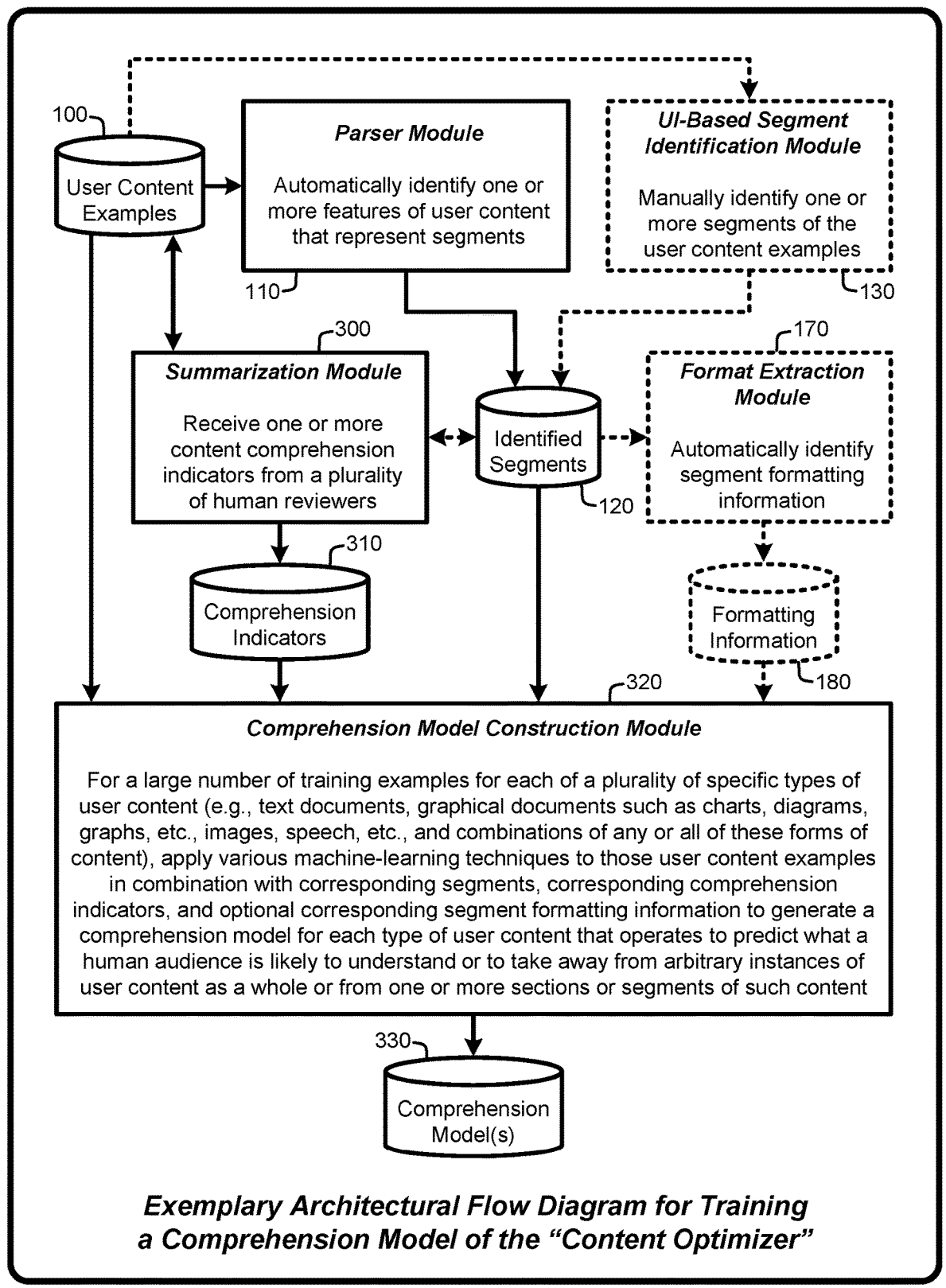
FIG. 3 provides an exemplary architectural flow diagram that illustrates program modules for training a comprehension model of a "Content Optimizer," as described herein.

Similar to FIG. 1, the system diagram of FIG. 3 illustrates the interrelationships between program modules for instantiating various implementations for training a comprehension model of the Content Optimizer, as described herein. Furthermore, while the system diagram of FIG. 3 illustrates high-level views of various implementations of the Content Optimizer, FIG. 3 is not intended to provide exhaustive or complete illustrations of every possible implementation of the Content Optimizer as described throughout this document.

In addition, any boxes and interconnections between boxes that may be represented by broken or dashed lines in FIG. 3 represent alternate or optional implementations of the Content Optimizer described herein. As such, any or all of these alternate or optional implementations, as described below, may be used in combination with other alternate or optional implementations that are described throughout this document. Furthermore, any of the components of FIG. 3 that show the same element numbers as FIG. 1 or FIG. 2 are intended to show reuse of the corresponding elements of these figures within the system diagram of FIG. 3.

As illustrated by FIG. 3, in various implementations, the processes enabled by the Content Optimizer for training the aforementioned comprehension model begin operation by receiving a large volume of training data comprising multiple user content examples 100. As mentioned, user content includes, but is not limited to, text documents, graphical documents such as charts, diagrams, graphs, etc., images, speech, videos, etc., and further includes combinations of any or all of these forms of content. As such, the type of training data comprising the user content examples 100 is generally matched to one or more particular types of user content intended to be processed by the overall Content Optimizer. Consequently, each of the resulting comprehension models generated by the training process is inherently tailored or matched to the particular type of user content intended to be processed by the Content Optimizer.

In various implementations, the user content examples 100 are provided to the Parser Module 110. As with training of the relevancy model of FIG. 1, the Parser Module 110 is again separately applied to each of the individual user content examples 100 to automatically extract a plurality of features from each of those user content examples. As discussed, the particular types of segments extracted from the user content examples 100 are dependent on the particular type of user content being examined (e.g., text, charts, speech represented by either audio or combined audio and video, etc.). In other words, as illustrated by FIG. 3, the Parser Module 110 applies various feature extraction techniques to automatically identify one or more features of the user content that represent segments of that content, thereby generating a separate set of identified segments 120 for each individual user content example 100. In addition, in various implementations, the optional UI-Based Segment Identification Module 130 is provided to enable one or more human reviewers to manually identify or select one or more segments 120 from one or more of the user content examples 100.

In addition, in various implementations, a Summarization Module 300 is applied to the user content examples 100 and, optionally, to the corresponding identified segments 120. In general, the Summarization Module 300 is configured to receive inputs (e.g., "comprehension indicators" 310) from human reviewers with respect to what each of those human reviewers individually comprehended from their reading, viewing, listening to, or otherwise consuming a particular instance of one of the user content examples 100. In various implementations, these comprehension indicators 310 are provided by expert or crowdsourced workers tasked to review particular content examples, or by any reviewer (human or AI-based entity or application) that provides comprehension indicators for one or more training examples of user content.

In terms of content, each of the comprehension indicators 310 provides various informational features. These informational features include, but are not limited to content summary, specific information relating to relating to any combination of one or more particular segments of the user content or the content as a whole, a general or specific topic associated with any combination of one or more particular segments of the user content or the content as a whole, a summarization of the user content, etc. Further discussion of these comprehension indicators is provided in Section 2.3.3 of this document.

Further, in various implementations, the Format Extraction Module 170 automatically identifies formatting information 180 associated with each identified segment 120. As mentioned, the particular types of formatting information 180 identified by the Format Extraction Module 170 is dependent on the type of user content examples 100 being examined.

The identified segments 120, in combination with the original user content examples 100, the comprehension indicators 310 and optional formatting information 180, are then provided to a Comprehension Model Construction Module 320. The Model Construction Module 190 then generates a comprehension model 330 by applying various machine-learning techniques to the combination of inputs including, but not limited to, the identified segments 120, corresponding user content examples 100, comprehension indicators 310, and optional formatting information 180. In related implementations (not illustrated in FIG. 3), the Comprehension Model Construction Module 320 optionally applies either or both the implicit indicators 150 and the explicit indicators 160 described with respect to FIG. 1 as training features to learn the comprehension model 330.

Given the comprehension model 330, the Content Optimizer is then capable of predicting what a human audience is likely to understand, to take away, to comprehend, etc., from arbitrary user content. In other words, the comprehension model 330, once trained, generates comprehension predictions from arbitrary instances of user content. These comprehension predictions are then applied for various purposes, including, but not limited to, generating comprehension reports for arbitrary user content and/or generating one or more suggested changes to the formatting of one or more segments of the arbitrary user content.

Figure 4:
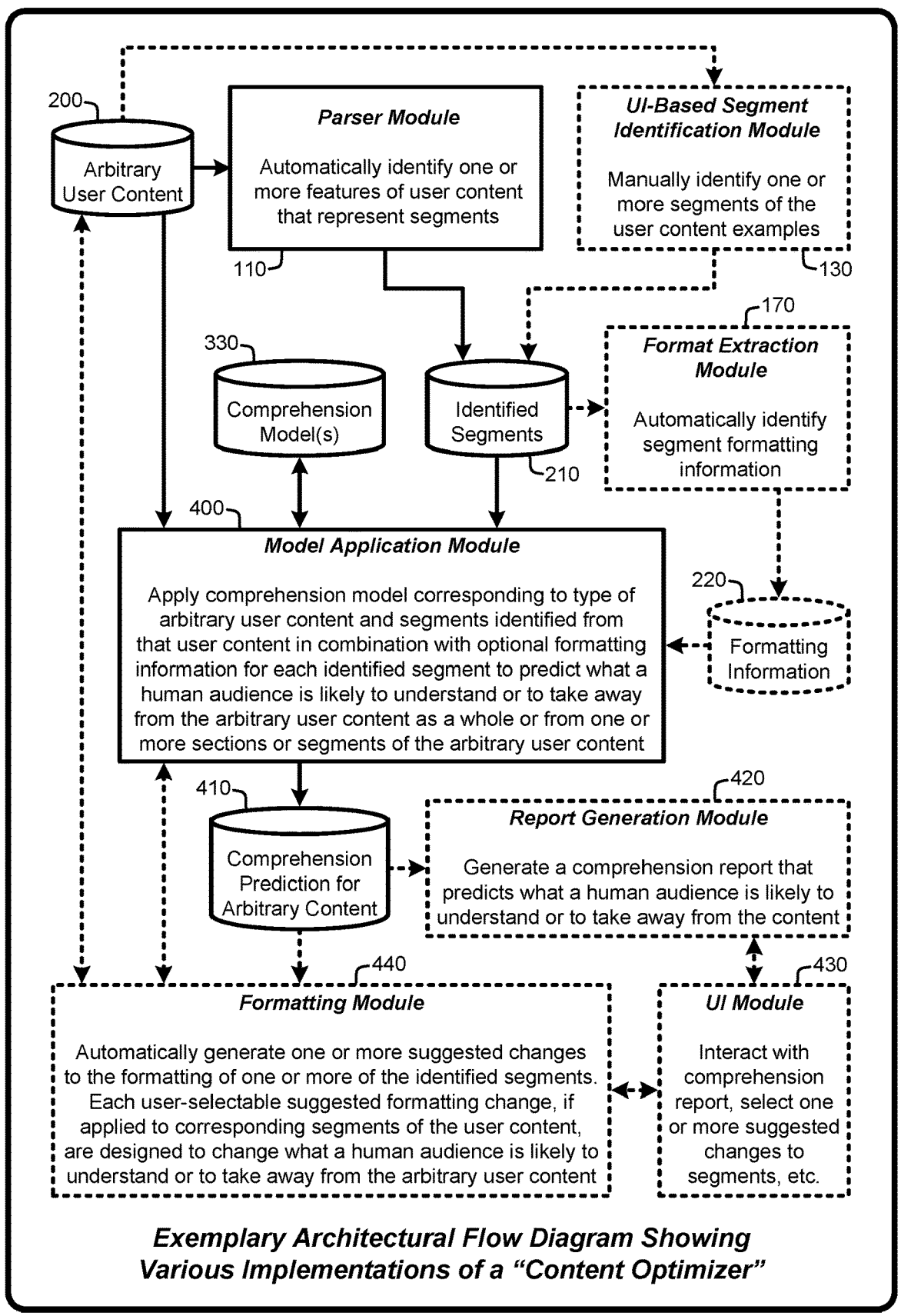
FIG. 4 illustrates use of the Content Optimizer for predicting what a human audience is likely to understand or to take away from arbitrary user content and providing various automated reports and suggestions for reformatting one or more segments to modify one or more of the segments to change the prediction of what the human audience is likely to understand or to take away from the arbitrary user content, as described herein.

For example, the system diagram of FIG. 4 illustrates the interrelationships between program modules for instantiating various implementations of the Content Optimizer for applying the trained relevancy model to arbitrary user content, as described herein. Furthermore, while the system diagram of FIG. 4 illustrates a high-level view of various implementations of the Content Optimizer, FIG. 4 is not intended to provide an exhaustive or complete illustration of every possible implementation of the Content Optimizer as described throughout this document.

In addition, any boxes and interconnections between boxes that may be represented by broken or dashed lines in FIG. 4 represent alternate implementations of the Content Optimizer described herein, and any or all of these alternate implementations, as described below, may be used in combination with other alternate implementations that are described throughout this document. Furthermore, any of the components of FIG. 4 that show the same element numbers as FIG. 1, FIG. 2 or FIG. 3 are intended to show reuse of the corresponding elements of these figures within the system diagram of FIG. 4.

More specifically, as illustrated by FIG. 4, in response to receipt of an instance of arbitrary user content 200, the parser module 110 of the Content Optimizer applies various feature extraction techniques to automatically identify one or more features of the arbitrary user content 200 that represent segments of that content, thereby generating a separate set of identified segments 210 for that arbitrary user content. In addition, in various implementations, the optional UI-Based Segment Identification Module 130 is provided to enable one or more human reviewers or end-users to manually identify or select one or more segments 210 from the arbitrary user content 200. Further, in various implementations, the Format Extraction Module 170 automatically identifies formatting information 220 associated with each identified segment 210 of the arbitrary user content 200.

Next, the arbitrary user content 200, the corresponding identified segments 210, and the corresponding optional formatting information 220 are provided to a Model Application Module 400. In general, the Model Application Module 400 applies one or more of the comprehension models 330 corresponding to type or types (e.g., multimedia document) of arbitrary user content 210 and segments 210 identified from that user content in combination with optional formatting information 220 for each identified segment. In response to these inputs, the Model Application Module 400, in cooperation with the comprehension model(s) 330 generate one or more comprehension predictions 410 for the arbitrary content 200. In other words, the Model Application Module 400 predicts what a human audience is likely to understand, to take away, to comprehend, etc., from the arbitrary user content 200.

In various implementations, given the comprehension predictions 410 for the arbitrary user content 410, the Content Optimizer applies a Report Generation Module 420 to generate a comprehension report that provides the predictions of what a human audience is likely to understand, to take away, to comprehend, etc., from the arbitrary user content 200. In various implementations, this comprehension report is presented via a user interface or the like. In various implementations, a UI Module 430 is provided to enable users to interact with this comprehension report. Further discussion regarding user interaction with the comprehension report is provided in Section 2.7 of this document.

In addition, in various implementations, a Formatting Module 440 automatically generates one or more suggested changes to the formatting of one or more of the identified segments 210. Each user-selectable suggested formatting change, if applied to corresponding segments 210 of the user content 200 are designed to modify the comprehension prediction 410 for the arbitrary content, as determined by the Model Application Module 400 through use of the comprehension model(s) 330.

For example, in various implementations, a plurality of suggested formatting changes are presented by the Formatting Module 440 via the UI module 430. In various implementations, each suggested formatting change is associated with a particular identified segment 210 (or multiple identified segments) and indicates the associated change in prediction of what a human audience is likely to understand, to take away, to comprehend, etc., from the arbitrary user content 200 upon user selection of the formatting change via the UI module 430. In various implementations, upon user selection of any such suggested formatting change, the Content Optimizer applies that suggested change to the corresponding identified segment (or multiple segments, depending on the suggested formatting change) to automatically modify the corresponding arbitrary user content 200. Other methods and further discussion of user interaction with the identified segments 210 and the arbitrary user content 200 with respect to suggested formatting changes are described in Section 2.7 of this document.

2.0 Operational Details of the Content Optimizer

The above-described program modules and/or devices are employed for instantiating various implementations of the Content Optimizer. As summarized above, the Content Optimizer provides various techniques for predicting levels of interest of segments of user content in combination with various automated reports and suggestions for reformatting one or more segments to modify the predicted levels of interest for one or more of the segments. Similarly, in various implementations, the Content Optimizer provides various techniques for predicting what a human audience is likely to understand or to take away from arbitrary user content (e.g., a "comprehension prediction") in combination with various automated reports and suggestions for reformatting one or more segments to modify the comprehension prediction. The following sections provide a detailed discussion of the operation of various implementations of the Content Optimizer, and of exemplary methods and techniques for implementing the features and program modules described in Section 1 with respect to FIG. 1 through FIG. 4. In particular, the following sections provides examples and operational details of various implementations of the Content Optimizer, including:

An operational overview of the Content Optimizer;
Identification of segments of user content for training;
Indicators of implicit and explicit interest and indicators of comprehension;
Relevancy and comprehension model training;
Relevancy (e.g., predicted interest) and comprehension reports;
Generation of suggested formatting changes; and
Exemplary user interface examples.

2.1 Operational Overview:

The Content Optimizer provides various techniques for predicting levels of interest, by a human audience of one or more persons, of segments of arbitrary user content. In various implementations, these predicted levels of interest are then applied to provide various automated reports and suggestions for reformatting one or more segments to modify the predicted levels of interest for one or more of those segments. In other words, in addition to providing reports as to predicted interest of various segments of arbitrary user content, in various implementations the Content Optimizer automatically changes (or suggest changes) to the layout or presentation of one or more segments of a document to modify a predicted likelihood of human audience focus on one or more of those segments.

More specifically, the Content Optimizer processes arbitrary user content based on one or more relevancy models trained on segments and interest indicators identified or otherwise extracted from large numbers of user content examples. These relevancy models are also optionally trained, in part, based on the actual formatting associated with the segments used for model training.

Following relevancy model training, arbitrary user content is processed by the Content Optimizer to identify or otherwise extract a plurality of segments from that arbitrary user content. These segments are automatically identified by the Content Optimizer and/or manually selected or identified via a user interface. In various implementations, the Content Optimizer then applies the relevancy model to evaluate the identified segments of the arbitrary content to generate a report or the like that summarizes or otherwise illustrates the predicted level of interest for one or more segments of the arbitrary user content.

Given these predicted levels of interest, in various implementations, the Content Optimizer generates one or more recommendations or suggestions to reformat one or more of the identified segments of the arbitrary user content. Each such suggested formatting change is designed to either increase or decrease predicted human audience interest or attention with respect to the corresponding segments. In other words, any suggested formatting change, if selected by the user, is automatically applied to automatically modify the arbitrary user content in a way that selectively controls predicted human audience interest in particular segments of the arbitrary user content. As such, in contrast to existing techniques that correct or modify spelling and/or grammar of user content, the Content Optimizer instead makes suggestions or optimizations that modifies formatting of segments of user content in a way that changes what a human audience is likely to be interested in or otherwise focus on in a given piece of text, user speech, a visualization, an image, video, etc. Simply stated, in various implementations, the Content Optimizer provides automated formatting suggestions that help an author or user alter formatting of arbitrary content to help their readers or viewers focus on particular segments of that content.

Following selection and application of one or more suggested formatting changes to modify the arbitrary user content, in various implementations, one or more optional scans of modified content are provided by the Content Optimizer to generate new predicted levels of interest and new suggested formatting changes. In other words, in various implementations, the Content Optimizer provides iterative scanning and suggested formatting changes until the user is satisfied with the formatting of the modified document.

Similarly, in various implementations, the Content Optimizer provides various techniques for predicting what a human audience is likely to understand or to take away from arbitrary user content (e.g., a "comprehension prediction"). In various implementations, these comprehension predictions are applied to generate and provide various automated reports regarding the arbitrary user content and suggestions for reformatting one or more segments to modify the comprehension prediction.

In further implementations, the Content Optimizer applies both the machine-learned relevancy models and the machine-learned comprehension models in combination, either sequentially or jointly. Such hybrid implementations enable the Content Optimizer to generate reports or otherwise inform the user as to changes in the prediction of what the human audience is likely to understand or to take away from the arbitrary user content whenever a suggested formatting change is selected or applied to modify the predicted level of interest of one or more of the segments. Similarly, such hybrid implementations, enable the Content Optimizer to generate reports or otherwise inform the user as to changes in the predicted level of interest of one or more of the segments whenever a suggested formatting change is selected or applied to modify the prediction of what the human audience is likely to understand or to take away from the arbitrary user content.

2.2 Identification of Segments of User Content for Training:

In various implementations, the Content Optimizer applies a parser module or the like to automatically identify one or more features or segments of arbitrary user content applied to train the relevancy model (or multiple relevancy models based on content type and/or the particular audience type) and/or the comprehension model (or multiple comprehension models based on the content type and/or the particular audience type). A user interface of the Content Optimizer may also be applied to manually identify one or more features or segments of arbitrary user content. Each identified segment represents any discrete feature or section that can be identified or otherwise extracted from of a particular instance of user content. As mentioned, user content includes, but is not limited to, text documents, graphical documents such as charts, diagrams, graphs, etc., images, speech, videos, etc., and further includes combinations of any or all of these forms of content.

Consequently, the particular types of features or segments that are identified within arbitrary user content, and the "formatting" associated with those segments, depend on the particular type of user content being processed by the Content Optimizer. In various implementations, a plurality of parser modules and the like are adapted to particular types of content. Parsing of any particular content to identify segments is then performed with one or more parsing modules or the like that are matched to the type of content being processed. Various parsing and extraction techniques for identifying discrete features or segments of different types of content are known to those skilled in the art and will not be described in detail herein.

For example, in the context of text-based user content, a segment is defined as a subsection of the arbitrary user content (e.g., a word-processor file, a text-based web page, or any other text-based document). Each such subsection comprises one or more sequential words, one or more sequential sentences, one or more sequential paragraphs, or any combination of one or more words, sentences and paragraphs. Further, such subsections may overlap (regardless of the type of content). For example, one subsection of a document may include a first sentence, while a second subsection of that same document may include two sentences and one or more additional words, comprising the first sentence, a sentence immediately preceding the first sentence and one or more additional words immediately following the first sentence.

Similarly, in the case of user content including one or more images, each image, or some sequence of images, represents a separate segment of the user content. In various implementations, text, such as, for example, titles, overlays, or related textual descriptions or information, associated with such images or image sequences represent either separate segments of the user content or a single combined multimedia segment (e.g., combined images and text, combined images and video, combined text, images and video, etc.) of the arbitrary user content.

Further, in the case of user content that include charts, graphs, etc., text or other elements or features associated with those charts also represents separate segments, or a single combined multimedia segment (e.g., charts and text, charts and images, etc.) of the arbitrary user content. For example, in various implementations, in an X-Y line graph, features including, but not limited to, individual data points of the graph, axis labels, axis tick marks, line styles, etc., chart size, etc., each represent separate segments of the user content.

In the case of speech, that speech may include, for example, audio only or some combination of audio, video and/or text such as subtitles, transcripts, etc. For example, consider a recording of speech (e.g., human-based speech, digital avatar-based speech, etc.), such as, for example, a person verbally presenting some topic to an audience. Individual segments of that speech include, but are not limited to, features such as individual words or sequences of two or more words, individual sentences or sequences of two or more sentences, voice tone or volume, speech emotional context, and, when video of the speech is available, user facial expressions, user body motions, gestures, audience reactions, etc.

2.3 Indicators of Implicit and Explicit Interest and Comprehension:

In various implementations, for training of the relevancy model, implicit indicators or signals as to what segments of the content a human audience is paying attention to is collected as an indicator or signal of interest in the corresponding segment. For example, any segment that a human audience pays attention to (e.g., time viewing, mouse tracking showing hover or mouseover or selection of a particular feature or segment, eye tracking showing viewing or reading of a particular feature or segment, etc.) is likely to be of interest to that audience. Conversely, these same implicit signals may be applied to determine that a human audience is not paying attention to or focusing a particular feature or segment of the content. For example, in the case of human (or avatar-based) speech, training data can include prerecorded speeches and sentiment tracking such as is often presented during televised political debates or other recorded speeches that have been presented to an audience.

Similarly, in various implementations, explicit indicators or signals of interest in particular segments are also collected as training data for use in training the relevancy model. For example, human review or ranking of particular content and/or particular segments of that content is collected as an explicit indicator or signal of interest (e.g., high interest, medium interest, low interest, no interest, etc.) in the corresponding segment.

In addition to considering one or more segments of the content to derive or provide implicit and/or explicit indicators of interest, in various implementations, the Content Optimizer may consider any combination of multiple segments (and formatting associated with those segments), up to and including the entirety of the content being considered. The resulting relevancy model is then responsive to the entirety of each instance of arbitrary user content. For example, overuse or underuse of particular formatting types throughout an entire document (or some subsection of that document) can change either or both the implicit and explicit indicators of interest used for relevancy model training. Similarly, use of too many different formatting types can change either or both implicit and explicit indicators of interest used for model training, with corresponding differences in suggested formatting changes.

For example, depending on model training, the effect of applying the relevancy model to suggest a formatting change to bold one sentence in an email might depend on whether other sentences in that same email are bolded. Similarly, an entire document such as, for example, a piece of text or image might be too "busy" (e.g., too many different segments or types of formatting), which might deter people from looking at it at all (e.g., implicit and/or explicit indicators indicating low or no interest in one or more segments or the document as a whole). In other words, in various implementations, model training considers one or more segments of each instance of user content and/or the overall instance of user content as a whole in combination with the interest indicators and, optionally, the existing formatting of each instance of content.

Both the implicit and explicit indicators of interest are then applied during training of the relevancy model. In other words, when compiling training data for use in generating the relevancy model, implicit and explicit signals of interest are identified or otherwise extracted via a variety of techniques. These implicit and explicit indicators of interest are then applied as training signals in any of a variety of machine-learning processes to generate the relevancy model.

Advantageously, the resulting relevancy model then predicts, for an arbitrary document, what an arbitrary human audience is likely to pay attention to or to be interested in (e.g., predicted levels of interest for segments of the arbitrary content). Further, if the particular audience type is known (e.g., a particular person or group of persons, a particular demographic group, persons speaking a particular language, persons in a particular corporate group or environment, etc.), one or more relevancy models may be trained using implicit and/or explicit signals of interest identified based on the same or similar audiences. The result is a relevancy model that is explicitly trained to match predicted interests of the particular audience for which that relevancy model has been trained.

Similarly, with respect to training of the aforementioned comprehension model, in various implementations, the Content Optimizer obtains training signals including, but not limited to, comprehension indicators corresponding to a large volume of examples of user content in combination with segments identified within that content and optional formatting information associated with those segments. These training signals are then applied in any of a variety of machine-learning processes to generate the comprehension model. Further, in various implementations, the aforementioned implicit and/or explicit indicators associated with one or more of the segments are also applied as training signals to learn the comprehension model.

Advantageously, the resulting comprehension model then predicts, for an arbitrary document, what an arbitrary human audience is likely to understand, to take away, to comprehend, etc., from that arbitrary user content. Further, as with training of the relevancy model, if the particular audience type is known, one or more comprehension models may be trained using implicit and/or explicit signals of interest identified based on the same or similar audiences. The result is a comprehension model that is explicitly trained to match predicted comprehension of the particular audience for which that comprehension model has been trained.

2.3.1 Implicit Interest Indicators:

Implicit indicators of interest may be derived using a variety of techniques that collect or otherwise identify or extract signals that occur while an audience of one or more persons (or multiple different audiences) are reading, viewing, listening to, or otherwise consuming user content examples. For example, implicit indicators may be derived from signals including, but not limited to, mouse or pointer tracking, document scrolling behaviors, eye tracking, etc. Further, in the case of images and videos, in various implementations, the Content Optimizer employs one or more perceptual models of what's actually in that video or image in combination of user behavior and/or response tracking to derive implicit to determine or identify segments of that content that is implicitly of interest to the audience.

For example, in the case of specific instrumentation for collecting implicit signals, one or more data collection stations having a display for rendering content and optional mice or other pointing devices or the like for interacting with that content may be employed. Such data collection stations enable capture or collection of the behaviors of multiple people (e.g., audience members) with respect to each of a plurality of particular documents or examples of user contents. More specifically, Instrumentation of such data collection stations enables the eyes and/or pointer motions, scrolling behaviors, facial expressions, etc., of the audience members to be tracked or otherwise captured. By performing such data collection operations for multiple documents, each with multiple people or audience members interacting with those documents, sufficient raw training data may be gathered for generating the machine-learned relevancy model (or multiple different relevancy models).

Another implicit indicator of audience interest (or lack of interest) in particular segments of content is to consider audience replies to anonymized messages, letters, or other content. For example, if a particular audience member replies to a particular example of user content (e.g., an email message, a letter, a voice mail, a text message, a tweet, etc.), that reply can be parsed or otherwise analyzed in combination with the particular example of user content to determine, at least implicitly, what that audience member found interesting or relevant in that particular example of user content. Similarly, audience interest (or lack of interest) in particular segments of content may include a consideration of inline answers or replies in email message chains or other documents as implicit signals that one or more audience members was interested or focused on specific elements of segments of the document In summary, implicit indicators of interest for use as training data for generating the relevancy model includes, but is not limited to:
  a. Instrumenting programs or applications to track user interaction with documents or other content examples;
  b. Tracking user gaze and/or facial expressions while reading, viewing, listening to, or otherwise consuming documents or other content examples;
  c. Tracking of pointers (e.g., mouse, pen, etc.) while reading, viewing, listening to, or otherwise consuming documents or other content examples;
  d. Extracting implicit signals of interest from parsing or analysis of audience replies or chains of correspondence relating to documents or other content examples;
  e. Extracting implicit signals of interest based on time stamps associated with video or audio content where audience members pause, repeat, and/or leave comments relating to particular segments of that content; and
  f. Combinations of any or all of these implicit signals sources 2.3.2 Explicit Interest Indicators:

In various implementations, multiple human audience members (e.g., human judges or experts) provide explicit subjective quality ratings or scores relating to the relevancy of particular segments of a document or other user content example. More specifically, human review of one or more user content examples, in combination with manual or automated segment identification, as discussed above, is performed to score or otherwise provide an explicit indicator of interest in particular segments of that content. Further, multiple different humans may review the same user content examples. As such, ratings from different humans that differ for the same output video may be combined, averaged, pruned with respect to high or low scores or ratings, etc., to produce composite ratings or other explicit indicators of interest for use in training the relevancy model. Further, in various implementations, even assuming the same user content examples, ratings by different demographic groups (e.g., gender, age, profession, etc.) for the same user content examples may be applied to train separate relevancy models that are tailored to the preferences of those groups.

2.3.3 Comprehension Indicators:

In general, comprehension indicators are received as informational features or the like from a plurality of human reviewers in response to those human reviewers reading, viewing, listening to, or otherwise consuming individual instances of user content used as a training example. In various implementations, these informational features are defined or created as free-text annotations or descriptions by the individual reviewers. Alternately, or in addition, in various implementations, these informational features are selected via a user interface or the like by the individual reviewers from a database, set or list that provides a plurality of predefined informational features for reviewer selection.

The informational features representing the comprehension indicators include, but are not limited to features such as: content summary (e.g., "This document relates to Post-Impressionist paintings by Vincent van Gogh"); specific information relating to relating to any combination of one or more particular segments of the user content (e.g., "The second slide of the presentation relates to Maxwell's Equations") or the content as a whole (e.g., "This document may be of interest to electrical engineers"); a general or specific topic associated with any combination of one or more particular segments of the user content ("e.g., "Cooking," "Woodworking," "Jogging," etc.) or the content as a whole; a summarization of the user content (e.g., "This document describes techniques for implementing cloud-based services based on the use of functional quantum computers"); etc.

2.4 Relevancy and Comprehension Model Training:

In addition to the use of automatically and/or manually identified segments of user content examples and corresponding implicit and/or explicit indicators of interest in those segments, in various implementations, the relevancy model is trained on automatically identified formatting information associated with each identified segment. In general, given training data that includes, but is not limited to user content examples, corresponding identified segments, corresponding implicit and/or explicit indicators of interest, corresponding segment formatting information, etc., one or more relevancy models are trained to predict levels of interest in particular segments of arbitrary user content.

Similarly, in various implementations, training signals applied to learn the comprehension model include, but are not limited to, comprehension indicators corresponding to a large volume of examples of user content in combination with segments identified within that content and optional formatting information associated with those segments. These training signals are then applied in any of a variety of machine-learning processes to generate the comprehension model. Further, in various implementations, the aforementioned implicit and/or explicit indicators associated with one or more of the segments are also applied as training signals to learn the comprehension model As mentioned, user content includes, but is not limited to, text documents, graphical documents such as charts, diagrams, graphs, etc., images, speech, etc., and further includes combinations of any or all of these forms of content. As such, the type of training data comprising the user content examples is generally matched to particular types of user content to be processed by the overall Content Optimizer. In other words, if the Content Optimizer is intended to process arbitrary examples of user content comprising textual data, then the relevancy model and the comprehension model will be trained on user content examples comprising textual data. Similarly, if the Content Optimizer is intended to process arbitrary examples of user content comprising speech data, then the relevancy model and the comprehension model will be trained on user content examples comprising speech data.

Consequently, while a single relevancy model or comprehension model covering all types of user content examples can be learned, in various implementations multiple relevancy models and comprehension models, each trained on particular types of user content examples are learned by any of a variety of machine learning techniques. Similarly, one or more relevancy models and comprehension models can be trained to match one or more particular audiences (of one or more specific people) or particular demographic groups of people based on training data relating to those audiences or groups.

More specifically, in various implementations, training of the machine-learned relevancy model for predicting the level of interest in particular segments of arbitrary content is achieved by applying various machine-learning techniques to learn a probabilistic or statistical relevancy function, R. Similarly, in various implementations, training of the machine-learned comprehension model for predicting what a human audience is likely to understand is achieved by applying various machine-learning techniques to learn a probabilistic or statistical comprehension function, C.

In various implementations, the relevancy function, comprising the relevancy model, is learned from a combination of user content examples, corresponding identified segments, corresponding implicit and/or explicit indicators of interest, corresponding segment formatting information. Any desired model generation techniques may be applied to the combination of user content examples, corresponding identified segments, corresponding implicit and/or explicit indicators of interest, corresponding segment formatting information for generation of the relevancy model. Examples of such techniques include, but are not limited to, nonlinear regression engines, classifiers, support vector machines, random forests, neural networks, deep learning techniques, etc.

Similarly, in various implementations, the comprehension function, comprising the comprehension model, is learned from a combination of user content examples, corresponding identified segments, corresponding comprehension indicators, optional implicit and/or explicit indicators of interest, and optional corresponding segment formatting information. Any desired model generation techniques may be applied to the combination of user content examples, corresponding identified segments, corresponding comprehension indicators, optional implicit and/or explicit indicators of interest, and optional corresponding segment formatting information for generation of the comprehension model.

Regardless of the training techniques used, relevancy and comprehension model training is performed using the above-described inputs and training examples that are specific to the particular types of user content being processed. As such, multiple different relevancy and comprehension models may be trained, with each model corresponding to a particular type of user content (e.g., text documents, audio documents, human speech, etc.). Then, following model training, the Content Optimizer will automatically evaluate the arbitrary user content to detect the type of content and apply the corresponding relevancy and/or comprehension model to that arbitrary content to make the various predictions enabled by those models with respect to that arbitrary content.

Advantageously, because model training considers either or both implicit and explicit indicators of interest and comprehension indicators provided by human reviewers, the predictions resulting from application of the relevancy and comprehension models to arbitrary user content closely emulate subjective human interest levels for each of the identified segments of that arbitrary content and general comprehension of the overall arbitrary content or particular sections of that arbitrary content.

2.5 Relevancy and Comprehension Reports:

In its simplest implementation, the Content Optimizer applies the machine-learned relevancy model to process an arbitrary document (in combination with segments and optional formatting information identified in that arbitrary document) and generates an output report that identifies, as probabilistic or statistical predictions of levels of interest, what a human audience is likely to focus on or to be interested in when reading or otherwise consuming that arbitrary document. Similarly, in various implementations, the Content Optimizer applies the machine-learned comprehension model to process an arbitrary document (in combination with segments and optional formatting information identified in that arbitrary document) and generates an output report that identifies, as probabilistic or statistical predictions, what a human audience is likely to understand or to take away when reading or otherwise consuming that arbitrary document.

In various implementations, the Content Optimizer then generates a relevancy report and/or a comprehension report. In general, the relevancy report provides the predicted level of interest for each of the content segments. Similarly, the comprehension report provides a prediction of what human audience is likely to understand or to take away when reading or otherwise consuming an arbitrary document. Either or both the relevancy report and the comprehension report are optionally presented via a user interface or the like.

In general, user interface-based formats for the relevancy report include, but are not limited to, informational overlays for one or more of the segments, pointer-based popups for one or more segments (e.g., click, hover, or mouseover on a segment to show the predicted level of interest), automatically highlighting segments within the content with various user-customizable colors corresponding to predicted levels of interest (e.g., red for high predicted interest level, blue for low predicted interest level, etc.), presentation of predicted level of interest in one or more windows adjacent to a display of the user content, etc. In another implementation, the relevancy report is presented as a probabilistic heat map that shows areas of differing levels of interest over the entire document (or some user selected portion of the document).

For example, areas that are predicted to be of high interest may be highlighted in red (or some user selectable color or shading) while areas that are predicted to be of low interest are highlighted in blue (or some user selectable color or shading), etc.

In general, the relevancy reports, and user interactions with the relevancy report are not limited to the specific examples described. More specifically, the relevancy report is presented via any desired graphical, audio, and/or video techniques for conveying optionally interactive predicted levels of interest for particular segments of arbitrary content.

For example, in the case of an arbitrary text document, in one implementation, the relevancy report provides a predicted likelihood or level of interest for each sentence (or other segment) of the arbitrary text document. This relevancy report can be presented as an overlay, popup, text report, etc. For example, a simple human readable report including information such as, for example, "The first sentence of second paragraph has a 36% likelihood of being read by your target audience". Such information can also be presented for a particular segment in response to a user-initiated pointer click or other selection of a particular segment or sentence of the text document.

Similarly, user interface-based formats for the comprehension report include, but are not limited to, informational overlays for the arbitrary content or some section of that arbitrary content, pointer-based popups or informational windows for the arbitrary content or some section of that arbitrary content (e.g., click, hover, or mouseover on a document to show the comprehension prediction for that document), automatically highlighting one or more segments or sections within the content with various user-customizable colors corresponding to what the human audience is likely to understand or to take away when reading or otherwise consuming that arbitrary document, etc. As with the relevancy reports, the comprehension reports and user interactions with the comprehension reports are not limited to the specific examples described. More specifically, the comprehension report is presented via any desired graphical, audio, and/or video techniques for conveying optionally interactive predictions of what a human audience is likely to understand or to take away when reading or otherwise consuming arbitrary content.

2.6 Generation of Suggested Formatting Changes:

As mentioned herein, in various implementations, the Content Optimizer generates a plurality of suggested formatting changes to one or more of the identified segments of an arbitrary user document or other content. Each of these suggested formatting changes directly corresponds to either or both a modification of the predicted level of interest of one or more of the identified segments (e.g., increase or decrease the predicted level of interest in those segments) for a human audience, or a change in the prediction of what a human audience is likely to understand or to take away when reading or otherwise consuming that arbitrary document. In various implementations, some or all of these suggested formatting changes are presented to the user (and/or automatically applied to the arbitrary content) in response to either or both the predicted levels of interest of segments of arbitrary user content generated by the relevancy model and the comprehension predictions generated by the comprehension model. Either upon user selection or in response to automatic selection of one or more of the suggested formatting changes by the Content Optimizer, the selected formatting changes are then automatically applied to modify the format of one or more segments of the arbitrary user document or other content, thereby modifying the predicted level of interest in any corresponding segments of that content and/or the prediction of what a human audience is likely to understand or to take away when reading or otherwise consuming that arbitrary document.

As mentioned, the particular types of formatting changes that may be suggested are a function of the particular type of content being processed by the Content Optimizer. In various implementations, the types of formatting that may be recommended are drawn from formatting examples identified during training of the relevancy model and/or the comprehension model. For example, as described with respect to FIG. 2, in various implementations, the Format Extraction Module 170 automatically identifies formatting information 220 associated with each identified segment 210 of the arbitrary user content 200. Consequently, in various implementations, the Content Optimizer maintains a list or set comprising examples of all types of formatting data observed during the training process. The Content Optimizer then draws from those observed examples when suggesting formatting changes for the arbitrary user content. In various implementations, this list or set of observed examples of formatting data is user customizable (e.g., add examples of formatting data, remove examples of formatting data, change color, font, or other features or characteristics of examples of formatting data, etc.).

In addition to any suggested formatting changes previously discussed, each of which depend on the particular type of content being processed by the Content Optimizer, there are many additional possible suggested formatting changes that may be presented by the Content Optimizer. For example, with respect to images and charts in arbitrary content, these additional suggested formatting changes include, but are not limited to: making images larger or smaller; moving images; adding or removing image titles or text from images or charts; reformatting image titles or text; changing one type of chart to another (e.g., recommended formatting change from a pie chart to a bar chart); reducing an amount of formatting in content (e.g., too much bolding or capitalization in a text document); increasing a font size for some or all elements of a chart or graph; etc.

Further with respect to verbal information in arbitrary content (e.g., a user speech to be presented), these additional suggested formatting changes include, but are not limited to: suggestions to speak louder or more softly for a particular segment; suggestions to pound on a table in combination with a particular segment; suggestions to laugh or smile in combination with a particular segment; suggestions to reorganize one or more segments of the speech, etc.

With respect to the combined use of the comprehension model and the relevancy model, for example, the Content Optimizer may be applied for optimizing charts (or any other content type) as a combined function of both audience interest in particular segments of a document and the prediction of what the audience is likely to understand from that document. For example, the relevancy model might indicate that an audience might be paying attention to certain areas of a chart, while the comprehension model might indicate that the audience is predicted to understand or comprehend something different than what is intended by the user. In other words, the combined use of the relevancy and comprehension models might indicate that the audience is focusing on a particular feature of a chart but not really getting the point of the chart as intended by the user. In such cases, based on user selection of one or more suggested formatting changes, the chart (or other content) can be modified by the Content Optimizer in a way that clarifies the intent of the user with respect to audience comprehension of one or more particular elements of the chart (or other content).

Advantageously, in various implementations, in addition to predicting interest levels of segments of arbitrary content, the relevancy model is applied to identify one or more of the suggested formatting changes to those segments. Similarly, the comprehension model may be applied to identify one or more of the suggested formatting changes to those segments. For example, given the list or set of observed types of formatting data (e.g., possible formatting changes), the Content Optimizer, operating in a trial or test mode or the like, can apply any or all of the possible formatting changes, or combinations of multiple possible formatting changes, to each segment or multiple segments of the arbitrary content. The Content Optimizer then reprocess the newly modified content with either or both the relevancy model and the comprehension model, using the techniques described herein, to predict how each possible formatting change (if applied to the content) will modify either or both the predicted level of interest for the corresponding segment and one or more comprehension predictions associated with the arbitrary content.

This trial application of formatting changes can then be used to compile a report of how each possible suggested formatting change will modify the predicted level of interest for one or more of the segments and/or the comprehension predictions associated with the arbitrary content. In other words, in various implementations, by applying each possible formatting change to the segments of the arbitrary user content, the relevancy model and/or the comprehension model can perform overall prediction of interest levels comprehension predictions for each possible formatting change, followed by ranking each possible formatting change (in terms of increase or decrease in predicted level of interest or in change to comprehension predictions). Given this information, the Content Optimizer then highlights or otherwise suggests or presents one or more of the highest ranked formatting changes for one or more of the segments as suggested formatting changes.

Further, in various implementations, the Content Optimizer receives an input, via the user interface, as to an intent of the user modifying the formatting of the arbitrary content. Such inputs of user intent include, but are not limited to, increasing a likelihood that a higher percentage of the audience is interested in the entire document, increasing a likelihood that a particular segment of the content will be of interest to as many (or as few) members of the audience as possible, increasing a likelihood of a reply to one or more segments of the content, etc. Given this input of user intent, in various implementations, the Content Optimizer automatically selects and applies one or more of the suggested formatting changes without requiring further user input or selection. In other words, in various implementations, the Content Optimizer receives user inputs or feedback (e.g., user wants to emphasize (or deemphasize) a particular segment, prioritize (or deprioritize) a particular segment), or change what the audience is predicted to understand from the arbitrary document. Then, given this user feedback the Content Optimizer will limit the suggested formatting changes to one or more suggested formatting changes designed to achieve the intent of the user.

2.7 Exemplary Uses and User Interface Examples:

In general, the user interfaces for interacting with the relevancy report, the suggested formatting changes, and the underlying arbitrary user content, are intended to provide a variety of interactive tools that enable the user to: 1) view and interact with the predicted level of interest of segments; 2) view, modify and/or select one or more suggested formatting changes; 3) directly modify or edit the arbitrary user content, etc. In general, these interactive user interface tools include, but are not limited to, informational overlays for one or more of the segments, pointer-based popups for one or more segments, automatically highlighting segments within the content, presentation of predicted level of interest and/or suggested formatting changes in one or more windows adjacent to a display of the arbitrary user content, etc.

In various implementations, following application of the relevancy and/or comprehension models to the arbitrary user content, the Content Optimizer provides various forms of feedback, including, but not limited to: 1) a summary of what a typical audience member is likely to comprehend or take away from that content; 2) suggestions as to changes in the formatting that are likely to improve audience comprehension of the arbitrary content (e.g., suggestions that will increase, or decrease, audience interest in particular segments of the arbitrary content), etc.

For example, in various implementations, once the relevancy model is trained, the resulting predictions of interest for segments of arbitrary documents are provided to the user editing that document. For example, the relevancy report may present information via the user interface such as " . . . A reader of your document is likely to pay attention to the following segments of the document . . . ." The UI of the Content Optimizer can also provide automated suggestions to make particular segments of the document more interesting to the audience (e.g., " . . . bold this segment . . . " or " . . . change color of this text . . . " or " . . . reorder these items . . . " or " . . . move this segment to the top . . . " or " . . . pound your fist and speak louder when making this statement . . . ", etc.) along with an indication of how each such suggested formatting change will modify the corresponding predicted level of interest.

As mentioned above, the Content Optimizer, when applying the relevancy model, provides suggested formatting changes to modify the predicted level of interest in various segments of arbitrary content. Following is an exemplary list of possible uses for these capabilities. The following list is not intended to limit the use of the Content Optimizer to the examples described, and is provided only for purposes of illustration and example:

a. Modifying formatting or one or more segments of a presentation slide or the like to emphasize (or deemphasize) particular segments of the presentation slide;

b. Integrating the Content Optimizer into a word processor, email editor or other content generation or editing application to act as an automated editing assistant to emphasize (or deemphasize) particular segments of content being authored or edited by the user;

c. Applying the Content Optimizer to identify cases where there is too much relevant content and suggest that the user "tone it down" by deemphasizing some of the segments (or even deleting one or more segments that are not particularly relevant to the audience or the user).

d. Integrating the Content Optimizer into an application for generation and/or editing of plots and visualizations of data. For example, in a plot of X-Y data, the Content Optimizer may suggest formatting changes such as, for example, changing line type, changing point types, adding or modifying color, connecting points with a line, using different type of scaling, emphasizing particular points on graph, etc.

In various implementations, following selection or application of one or more of the suggested formatting changes to modify the arbitrary user content, the Content Optimizer presents the changed content to the user. These changes may include, but are not limited to, modifications to text, images, etc. Further, with respect to suggested modifications to user speech, in various implementations, the Content Optimizer applies existing rendering techniques to synthesize and present the modified user speech, either as annotated text or as a visual representation with or without digital avatars to show facial expressions and physical motions in addition to any modifications as to how speech is to be presented (e.g., loud, soft, excited, sad, etc.). In other words, with respect to video-based representations of formatting changes to user speech content, in various implementations, the Content Optimizer annotates the video, e.g., text (or verbal) instructions to perform a particular expression or physical action in combination with speech. Similarly, the Content Optimizer may use conventional rendering techniques to show an avatar performing a particular expression or physical action in combination with speech Further, in various implementations, the Content Optimizer includes various spelling and grammar checkers and the like to enable the user to correct either or both spelling and grammar in addition to the relevancy reports and suggested formatting changes provided by the Content Optimizer. Such spelling and grammar correction techniques are known to those skilled in the art and will not be described in detail herein.

3.0 Operational Summary of the Content Optimizer

Figure 5:
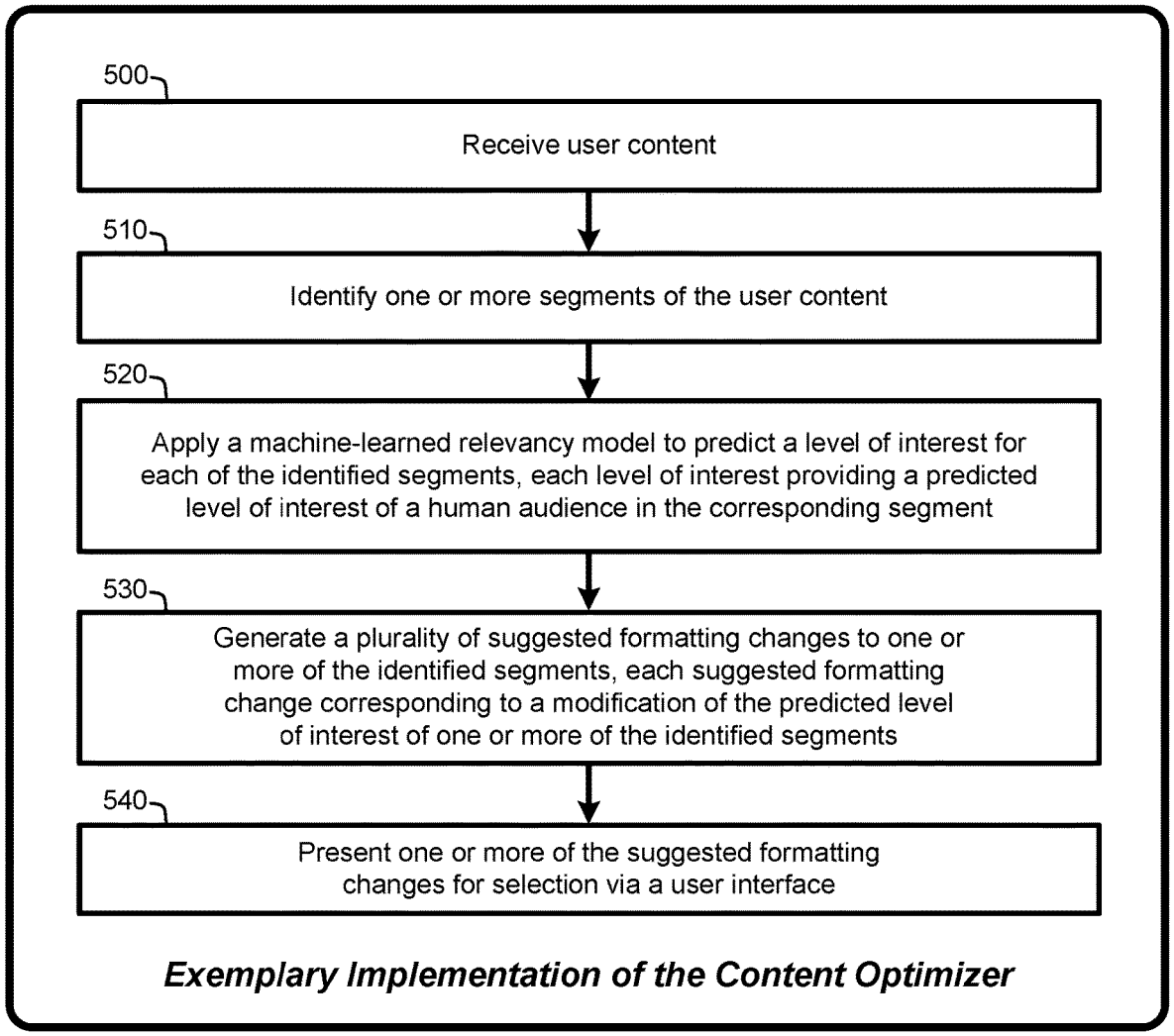
FIG. 5 illustrates a general system flow diagram that illustrates exemplary techniques for effecting various implementations of the Content Optimizer, as described herein.
Figure 6:
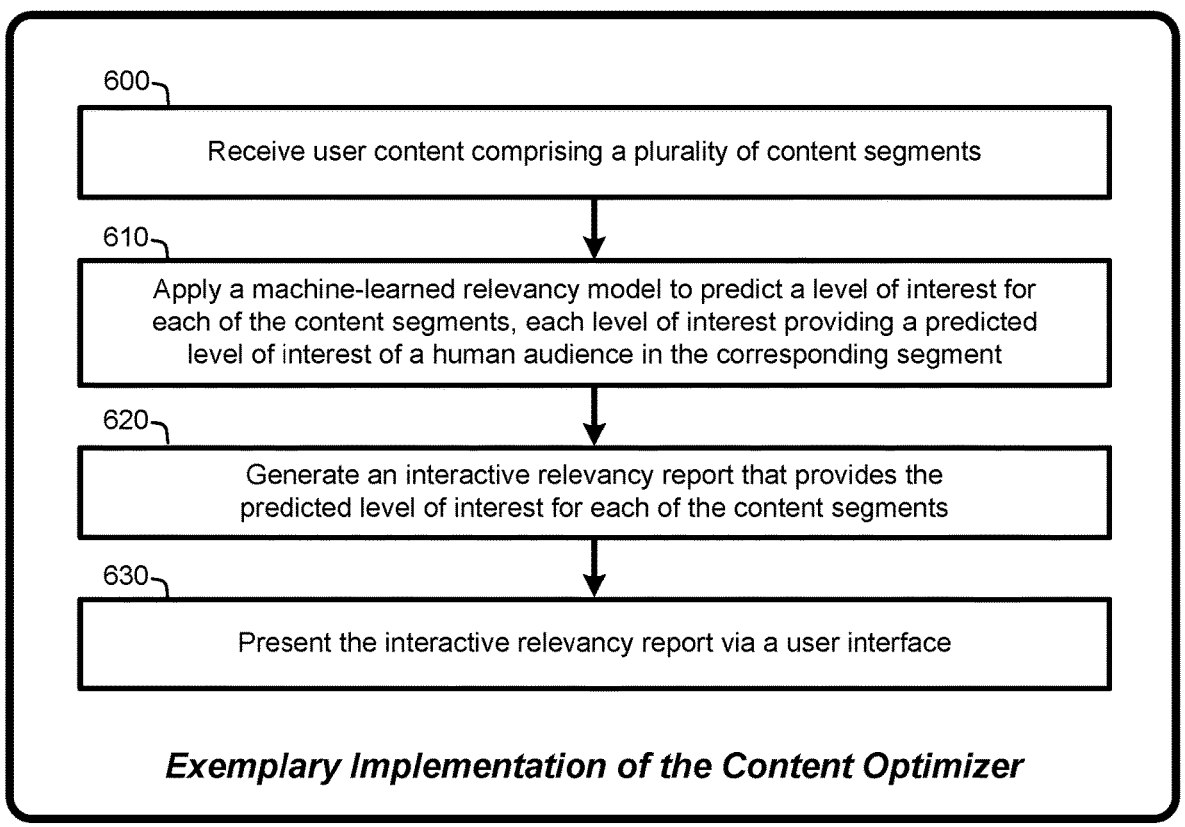
FIG. 6 illustrates a general system flow diagram that illustrates exemplary techniques for effecting various implementations of the Content Optimizer, as described herein.
Figure 7:
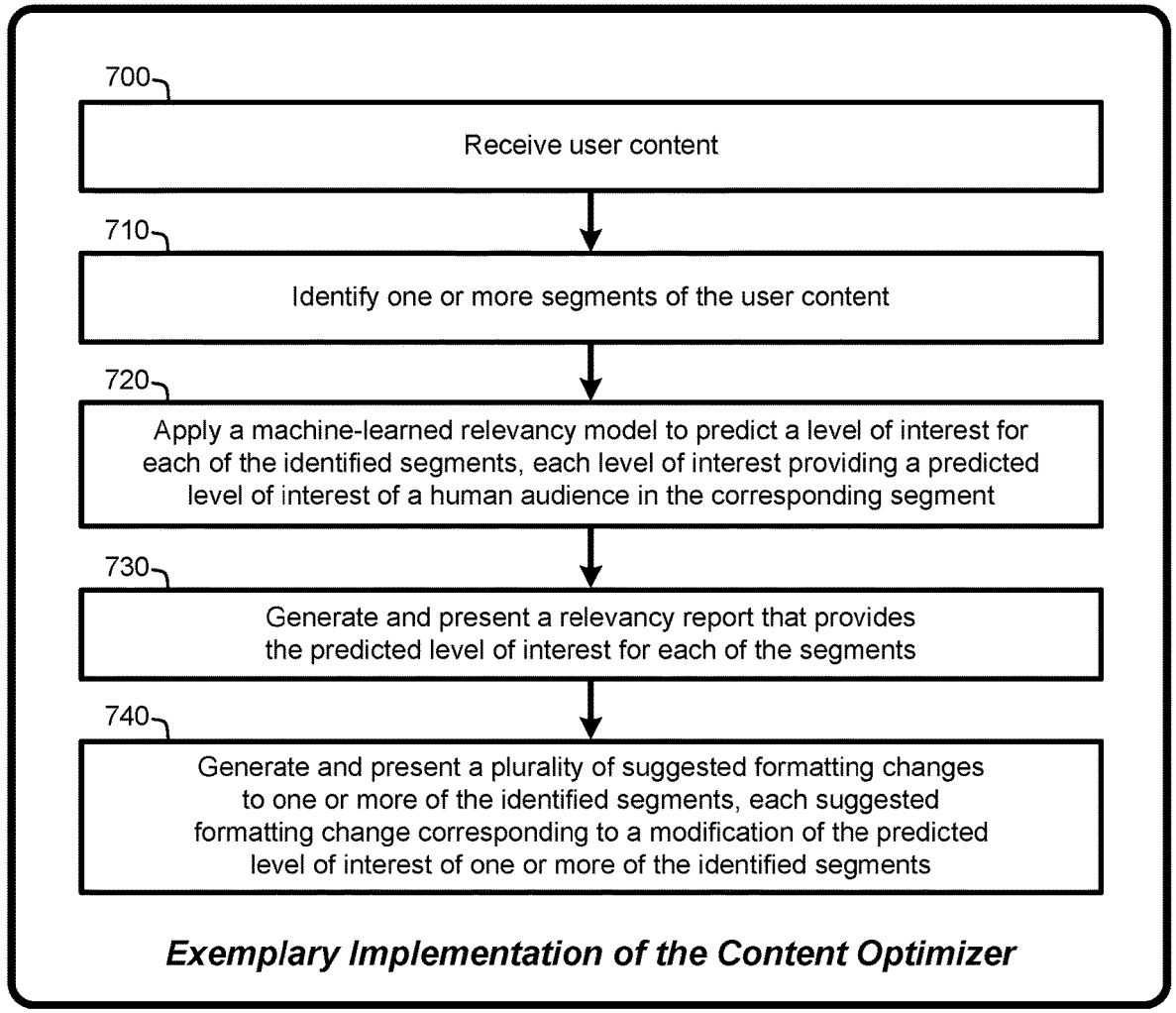
FIG. 7 illustrates a general system flow diagram that illustrates exemplary techniques for effecting various implementations of the Content Optimizer, as described herein.

The processes described above with respect to FIG. 1 through FIG. 4, and in further view of the detailed description provided above in Sections 1 and 2, are illustrated by the general operational flow diagrams of FIG. 5 through FIG. 7. In particular, FIG. 5 through FIG. 7 provide exemplary operational flow diagrams that summarizes the operation of some of the various implementations of the Content Optimizer. FIG. 5 through FIG. 7 are not intended to provide an exhaustive representation of all of the various implementations of the Content Optimizer described herein, and the implementations represented in these figures are provided only for purposes of explanation.

Further, any boxes and interconnections between boxes that may be represented by broken or dashed lines in FIG. 5 through FIG. 7 represent optional or alternate implementations of the Content Optimizer described herein, and any or all of these optional or alternate implementations, as described below, may be used in combination with other alternate implementations that are described throughout this document.

In general, as illustrated by FIG. 5, in various implementations, the Content Optimizer begins operation by receiving (500) arbitrary user content. Next, in various implementations, the Content Optimizer identifies (510) one or more segments of the user content. The Content Optimizer then applies (520) a machine-learned relevancy model to predict a level of interest for each of the identified segments. Each of these levels of interest provides a predicted level of interest of a human audience in the corresponding segment. Next, in various implementations, the Content Optimizer generates (530) a plurality of suggested formatting changes to one or more of the identified segments. Each of these suggested formatting changes corresponds to a modification of the predicted level of interest of one or more of the identified segments. Finally, in various implementations, the Content Optimizer presents (540) one or more of the suggested formatting changes for selection via a user interface.

Similarly, as illustrated by FIG. 6, in various implementations, the Content Optimizer begins operation by receiving (600) user content comprising a plurality of content segments. In various implementations, the Content Optimizer then applies (610) a machine-learned relevancy model to predict a level of interest for each of the content segments, each level of interest providing a predicted level of interest of a human audience in the corresponding segment. Next, in various implementations, the Content Optimizer continues by generating (620) an interactive relevancy report that provides the predicted level of interest for each of the content segments. Finally, in various implementations, the Content Optimizer presents (630) the interactive relevancy report via a user interface.

Similarly, as illustrated by FIG. 7, in various implementations, the Content Optimizer begins operation by receiving (700) user content. Next, in various implementations, the Content Optimizer continues by identifying (710) one or more segments of the user content. In various implementations, the Content Optimizer then applies (720) a machine-learned relevancy model to predict a level of interest for each of the identified segments. Each of these levels of interest providing a predicted level of interest of a human audience in the corresponding segment. Next, in various implementations, the Content Optimizer generates and presents (730) a relevancy report that provides the predicted level of interest for each of the segments. Finally, in various implementations, the Content Optimizer generates and presents (740) a plurality of suggested formatting changes to one or more of the identified segments, each suggested formatting change corresponding to a modification of the predicted level of interest of one or more of the identified segments.

4.0 Exemplary Implementations of the Content Optimizer

The following paragraphs summarize various examples of implementations that may be claimed in the present document. The implementations summarized below are not intended to limit the subject matter that may be claimed in view of the detailed description of the Content Optimizer. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, a Content Optimizer is implemented by means, processes or techniques for predicting levels of interest of segments of user content in combination with various automated reports and suggestions for reformatting one or more segments to modify the predicted levels of interest for one or more of the segments. Similarly, in various implementations, the Content Optimizer provides various techniques for predicting what a human audience is likely to understand or to take away from arbitrary user content (e.g., a "comprehension prediction") in combination with various automated reports and suggestions for reformatting one or more segments to modify the comprehension prediction. As such, the Content Optimizer enhances and improves user experience by enabling users to automatically format arbitrary content, or particular portions of that content, in a way that customizes the predicted levels of interest of a human audience with respect to particular segments of that content and/or to modify what the audience is predicted to comprehend, take away, or otherwise learn from that content.

As a first example, in various implementations, a Content Optimizer is implemented by a general purpose computing device via means, processes or techniques that begin operation by receiving arbitrary user content. The Content Optimizer then identifies one or more segments of the arbitrary user content. Next, in various implementations, the Content Optimizer applies a machine-learned relevancy model to predict a level of interest for each of the identified segments, each level of interest providing a predicted level of interest of a human audience in the corresponding segment. In various implementations, the Content Optimizer then generates a plurality of suggested formatting changes to one or more of the identified segments, each suggested formatting change corresponding to a modification of the predicted level of interest of one or more of the identified segments. Finally, in various implementations, the Content Optimizer presents one or more of the suggested formatting changes for selection via a user interface.

As a second example, in various implementations, the first example is further modified via means, processes or techniques further comprising receiving a plurality of user content examples, parsing the user content examples to identify one or more segments of the user content examples, receiving any combination of implicit and explicit indicators of interest associated with each of the segments of the user content examples, apply a machine-learning technique to the segments of the user content examples and the associated indicators of interest to generate the relevancy model.

As a third example, in various implementations, the second example is further modified via means, processes or techniques further comprising automatically identifying formatting information associated with each segment of the user content examples, and further applying the machine-learning technique to the formatting information to generate the relevancy model.

As a fourth example, in various implementations, any of the first example, the second, and the third example are further modified via means, processes or techniques further comprising generating a set of observed examples of formatting data from a plurality of user content examples, and generating the plurality of suggested formatting changes from the set of observed examples of formatting data.

As a fifth example, in various implementations, any of the first example, the second example, the third example, and the fourth example are further modified via means, processes or techniques further comprising applying a machine-learned comprehension model to predict of what the human audience is likely to understand when consuming the arbitrary user content.

As a sixth example, in various implementations, any of the first example, the second example, the third example, the fourth example and the fifth example are further modified via means, processes or techniques wherein the arbitrary content includes any combination of text-based content, image-based content, chart-based content, video-based content, and speech-based content.

As a seventh example, in various implementations, any of the first example, the second example, the third example, the fourth example, the fifth example, and the sixth example are further modified via means, processes or techniques further comprising receiving an input as to the intent of a user in modifying the predicted level of interest of one or more of the identified segments, and limiting the plurality of suggested formatting changes based on the input as to the intent of a user.

As an eighth example, in various implementations, a Content Optimizer is implemented by a general purpose computing device via means, processes or techniques that begin operation by receiving user content comprising a plurality of content segments. In various implementations, the Content Optimizer then applies a machine-learned comprehension model to the user content and the content segments to predict what the human audience is likely to understand when consuming the user content. In various implementations, the Content Optimizer then generates an interactive comprehension report that provides the prediction of what the human audience is likely to understand. Finally, in various implementations, the Content Optimizer the presents the interactive comprehension report via a user interface.

As a ninth example, in various implementations, the eighth example is further modified via means, processes or techniques further comprising generating a plurality of suggested formatting changes to one or more of the content segments, each formatting change adapted to modify the prediction of what the human audience is likely to understand when consuming the user content.

As a tenth example, in various implementations, any of the eighth example and the ninth example are further modified via means, processes or techniques further comprising applying a machine-learned relevancy model to predict a level of interest for each of the content segments, each level of interest providing a predicted level of interest of a human audience in the corresponding segment.

As an eleventh example, in various implementations, the tenth example is further modified via means, processes or techniques further comprising generating a plurality of suggested formatting changes to one or more of the content segments, each formatting change adapted to modify the predicted level of interest of one or more of the content segments.

As a twelfth example, in various implementations, the eleventh example is further modified via means, processes or techniques further comprising automatically applying one or more selected suggested formatting changes to the user content to reformat the user content.

As a thirteenth example, in various implementations, the twelfth example is further modified via means, processes or techniques further comprising rendering and presenting a representation of the reformatted user content via the user interface.

As a fourteenth example, in various implementations, the eleventh example is further modified via means, processes or techniques further comprising generating a set of observed examples of formatting data from a plurality of user content examples, and generating the plurality of suggested formatting changes from the set of observed examples of formatting data.

As a fifteenth example, in various implementations, the eleventh example is further modified via means, processes or techniques further comprising receiving plurality of user content examples, parsing the user content examples to identify one or more segments of the user content examples, receiving any combination of implicit and explicit indicators of interest associated with each of the segments of the user content examples, and applying a machine-learning technique to the segments of the user content examples and the associated indicators of interest to generate the relevancy model.

As a sixteenth example, in various implementations, a Content Optimizer is implemented via means, processes or techniques that begin operation by receiving arbitrary user content. In various implementations, the Content Optimizer then identifies one or more segments of the user content. Next, in various implementations, the Content Optimizer then applies a machine-learned relevancy model to predict a level of interest for each of the identified segments, each level of interest providing a predicted level of interest of a human audience in the corresponding segment. In various implementations, the Content Optimizer then generates and presents a relevancy report that provides the predicted level of interest for each of the segments. Finally, in various implementations, the Content Optimizer then generate and presents a plurality of suggested formatting changes to one or more of the identified segments, each suggested formatting change corresponding to a modification of the predicted level of interest of one or more of the identified segments.

As a seventeenth example, in various implementations, the sixteenth example is further modified via means, processes or techniques further comprising selecting, via a user interface, one or more of the suggested formatting changes, and automatically applying each selected suggested formatting change to modify the user content.

As an eighteenth example, in various implementations, the seventeenth example is further modified via means, processes or techniques further comprising rendering and presenting a representation of the modified user content via the user interface.

As an eighteenth example, in various implementations, any of the sixteenth example and the seventeenth example are further modified via means, processes or techniques further comprising for automatically generating a set of observed examples of formatting data from a plurality of user content examples.

As a twentieth example, in various implementations, the eighteenth example is further modified via means, processes or techniques further comprising generating the plurality of suggested formatting changes from the set of observed examples of formatting data.

5.0 Exemplary Operating Environments

Figure 8:
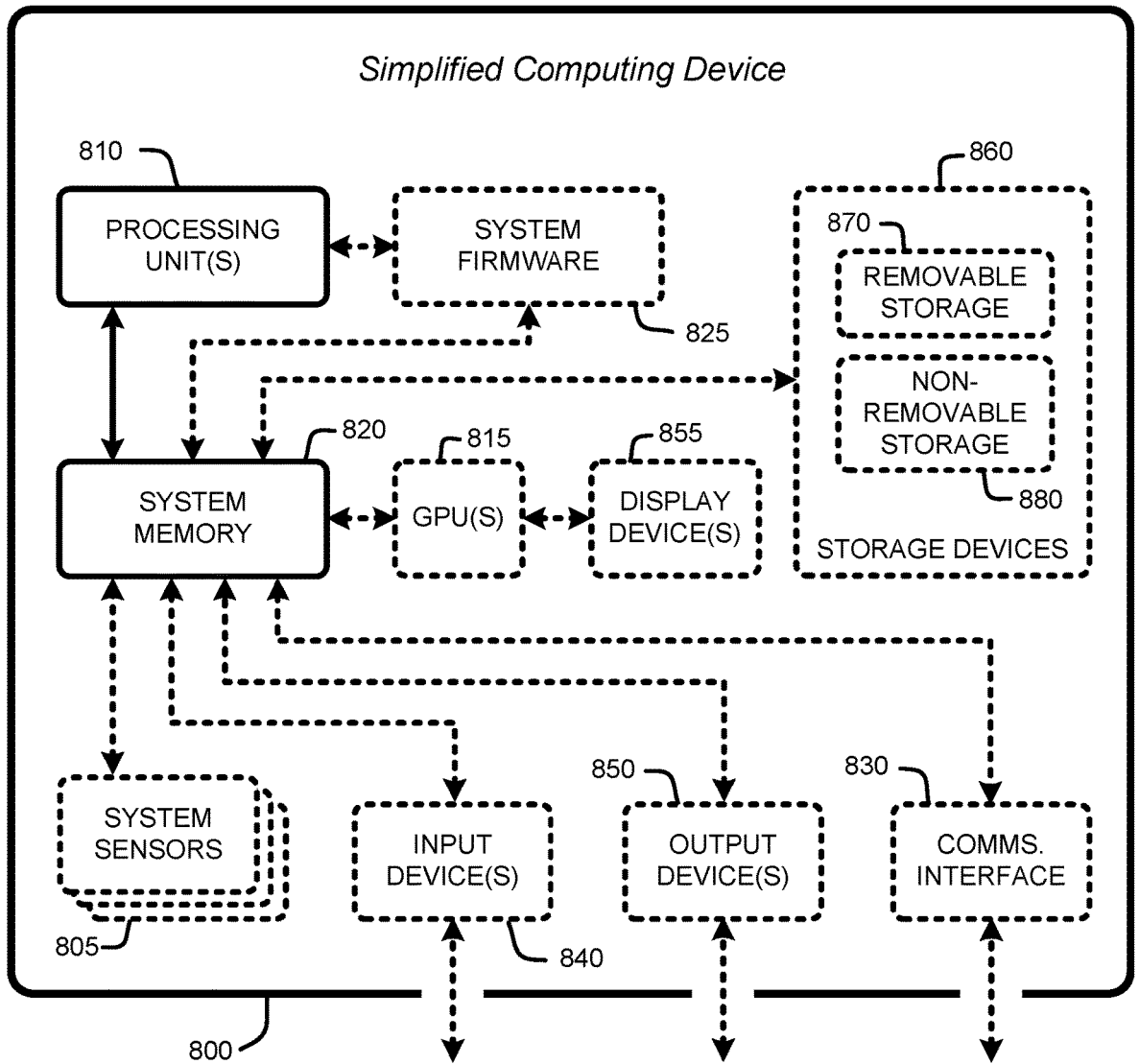
FIG. 8 is a general system diagram depicting a simplified general-purpose computing device having simplified computing and I/O capabilities for use in effecting various implementations of the Content Optimizer, as described herein.

The Content Optimizer implementations described herein are operational within numerous types of general purpose or special purpose computing system environments or configurations. FIG. 8 illustrates a simplified example of a general-purpose computer system on which various implementations and elements of the Content Optimizer, as described herein, may be implemented. Any boxes that are represented by broken or dashed lines in the simplified computing device 800 shown in FIG. 8 represent alternate implementations of the simplified computing device. As described below, any or all of these alternate implementations may be used in combination with other alternate implementations that are described throughout this document.

The simplified computing device 800 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Content Optimizer implementations described herein, the device should have a sufficient computational capability and system memory to enable basic computational operations. In particular, the computational capability of the simplified computing device 800 shown in FIG. 8 is generally illustrated by one or more processing unit(s) 810, and may also include one or more graphics processing units (GPUs) 815, either or both in communication with system memory 820. The processing unit(s) 810 of the simplified computing device 800 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 800 may also include other components, such as, for example, a communications interface 830. The simplified computing device 800 may also include one or more conventional computer input devices 840 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 800 and with any other component or feature of the Content Optimizer, including input, output, control, feedback, and response to one or more users or other devices or systems associated with the Content Optimizer, are enabled by a variety of Natural User Interface (NUI) scenarios. The NUI techniques and scenarios enabled by the Content Optimizer include, but are not limited to, interface technologies that allow one or more users user to interact with the Content Optimizer in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 840 or system sensors 805. Such NUI implementations are also enabled by the use of various techniques including, but not limited to, information derived from system sensors 805 or other input devices 840 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Content Optimizer.

However, the aforementioned exemplary NUI scenarios may be further augmented by combining the use of artificial constraints or additional signals with any combination of NUI inputs. Such artificial constraints or additional signals may be imposed or generated by input devices 840 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Content Optimizer.

The simplified computing device 800 may also include other optional components such as one or more conventional computer output devices 850 (e.g., display device(s) 855, audio output devices, video output devices, devices for transmitting wired or wireless data transmissions, and the like). Typical communications interfaces 830, input devices 840, output devices 850, and storage devices 860 for general-purpose computers are well known to those skilled in the art, and will not be described in detail herein.

The simplified computing device 800 shown in FIG. 8 may also include a variety of computer-readable media. Computer-readable media can be any available media that can be accessed by the computing device 800 via storage devices 860, and include both volatile and nonvolatile media that is either removable 870 and/or non-removable 880, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Content Optimizer implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 825, hardware, or any combination thereof to control a computer to implement the disclosed subject matter. The term "article of manufacture" as used herein is intended to encompass a computer program accessible from any computer-readable device, or media.

The Content Optimizer implementations described herein may be further described in the general context of computer-executable instructions, such as program modules, being executed by a computing device. Generally, program modules include routines, programs, objects, components, data structures, and the like, that perform particular tasks or implement particular abstract data types. The Content Optimizer implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations

The foregoing description of the Content Optimizer has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the Content Optimizer. It is intended that the scope of the Content Optimizer be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Content Optimizer described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A system, comprising:
   a general purpose computing device; and
   a computer program comprising program modules executable by the computing device, wherein the computing device is directed by the program modules of the computer program to:
   receive arbitrary user content from a user;
   identify one or more segments of the arbitrary user content;
   apply a machine-learned relevancy model to predict a level of interest for each of the identified one or more segments, each level of interest providing a predicted level of interest of a human audience in a corresponding segment of the identified one or more segments;
   generate a plurality of suggested formatting changes to one or more of the identified segments, each suggested formatting change corresponding to a modification of the predicted level of interest of at least one associated segment of the one or more identified segments;
   present one or more of the suggested formatting changes to the user for selection via a user interface, wherein the one or more suggested formatting changes are presented with an indicator of a predicted change in level of interest, and wherein the predicted change in level of interest comprises an increase or a decrease;
   responsive to receiving a selection of one or more suggested formatting changes from the user via the user interface, apply each selected suggested formatting change to at least one associated segment of the one or more identified segments;
   modify the predicted level of interest of each associated segment of the one or more identified segments to which one or more selected suggested formatting changes were applied; and
   present the user with the modified predicted level of interest of each associated segment of the one or more identified segments to which one or more selected suggested formatting changes were applied.

2. The system of claim 1, further comprising program modules that direct the computing device to:
   receive a plurality of user content examples;
   parse the user content examples to identify one or more segments of the user content examples;
   receive any combination of implicit and explicit indicators of interest associated with each of the one or more segments of the user content examples; and
   apply a machine-learning technique to the segments of the user content examples and the associated indicators of interest to generate the relevancy model.

3. The system of claim 2, further comprising program modules that direct the computing device to:
   automatically identify formatting information associated with each segment of the user content examples; and
   further applying the machine-learning technique to the formatting information to generate the relevancy model.

4. The system of claim 1, further comprising program modules that direct the computing device to:
   generate a set of observed examples of formatting data from a plurality of user content examples; and
   generate the plurality of suggested formatting changes from the set of observed examples of formatting data.

5. The system of claim 1, further comprising program modules that direct the computing device to apply a machine-learned comprehension model to predict a likelihood of the human audience understanding the arbitrary user content.

6. The system of claim 1, wherein the arbitrary user content includes any combination of text-based content, image-based content, chart-based content, video-based content, and speech-based content.

7. The system of claim 1, further comprising program modules that direct the computing device to:
receive an input as to an intent of the user in modifying the predicted level of interest of one or more of the identified segments; and
limiting the plurality of suggested formatting changes based on the input as to the intent of the user.

8. A computer-readable storage medium having computer executable instructions stored therein, said instructions causing a computing device to execute a method comprising:
receiving user content from a user, the user content comprising a plurality of content segments;
applying a machine-learned comprehension model to the user content and the plurality of content segments to predict a likelihood of a human audience understanding the user content;
generating an interactive comprehension report that provides the prediction of the likelihood of the human audience understanding the user content;
presenting the interactive comprehension report to the user via a user interface; and
responsive to receiving a selection of one or more content segments from the user via the user interface, presenting the user with comprehension information for the selected one or more content segments via the user interface; and
generating and presenting a plurality of suggested formatting changes to one or more of the content segments, wherein the plurality of suggested formatting changes are associated with one or more predicted changes in levels of interest, and wherein the one or more predicted changes in levels of interest comprise an increase level of interest or a decrease level of interest.

9. The computer-readable storage medium of claim 8, wherein each suggested formatting change is adapted to modify the prediction of the likelihood of the human audience understanding the user content.

10. The computer-readable storage medium of claim 8, further comprising applying a machine-learned relevancy model to predict a level of interest for each of the content segments, each level of interest providing a predicted level of interest of the human audience in a corresponding segment of the content segments.

11. The computer-readable storage medium of claim 10, wherein each suggested formatting change is adapted to modify the predicted level of interest of one or more of the content segments.

12. The computer-readable storage medium of claim 11, further comprising automatically applying one or more selected suggested formatting changes to the user content to reformat the user content.

13. The computer-readable storage medium of claim 12, further comprising rendering and presenting a representation of the reformatted user content via the user interface.

14. The computer-readable storage medium of claim 11, further comprising:
generating a set of observed examples of formatting data from a plurality of user content examples; and
generating the plurality of suggested formatting changes from the set of observed examples of formatting data.

15. The computer-readable storage medium of claim 10, further comprising:

receiving a plurality of user content examples;
parsing the user content examples to identify one or more segments of the user content examples;
receiving any combination of implicit and explicit indicators of interest associated with each of the one or more segments of the user content examples; and
applying a machine-learning technique to the one or more segments of the user content examples and the associated indicators of interest to generate the relevancy model.

16. A computer-implemented process comprising using a computer to perform process actions for:
receiving user content from a user;
identifying one or more segments of the user content;
applying a machine-learned relevancy model to predict a level of interest for each of the one or more identified segments, each level of interest providing a predicted level of interest of a human audience in a corresponding segment of the one or more identified segments;
generating and presenting a relevancy report that provides the predicted level of interest for each of the one or more identified segments;
generating and presenting to the user, via a user interface, a plurality of suggested formatting changes to at least one of the one or more identified segments, each suggested formatting change corresponding to a modification of the predicted level of interest of at least one associated segment of the one or more identified segments, wherein the plurality of suggested formatting changes are associated with one or more predicted changes in levels of interest, and wherein the one or more predicted changes in levels of interest comprise an increase level of interest or a decrease level of interest;
responsive to receiving a selection of one or more suggested formatting changes from the user via the user interface, applying each selected suggested formatting change to at least one associated segment of the one or more identified segments;
modifying the predicted level of interest of each associated segment of the one or more identified segments to which one or more selected suggested formatting changes were applied; and
presenting the user with the modified predicted level of interest of each associated segment of the one or more identified segments to which one or more selected suggested formatting changes were applied.

17. The computer-implemented process of claim 16 further comprising process actions for:
selecting, via the user interface, one or more of the suggested formatting changes; and
automatically applying each selected suggested formatting change to modify the user content.

18. The computer-implemented process of claim 17 further comprising process actions for rendering and presenting a representation of the modified user content via the user interface.

19. The computer-implemented process of claim 16 further comprising process actions for automatically generating a set of observed examples of formatting data from a plurality of user content examples.

20. The computer-implemented process of claim 19 further comprising process actions for generating the plurality of suggested formatting changes from the set of observed examples of formatting data.

* * * * *